(12) United States Patent
Kessler

(10) Patent No.: US 10,407,955 B2
(45) Date of Patent: Sep. 10, 2019

(54) STIFF FABRIC

(71) Applicant: Apple Inc., Cupertino, CA (US)

(72) Inventor: Patrick Kessler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 15/729,535

(22) Filed: Oct. 10, 2017

(65) Prior Publication Data

US 2018/0030765 A1    Feb. 1, 2018

Related U.S. Application Data

(63) Continuation of application No. 14/202,639, filed on Mar. 10, 2014, now abandoned.

(60) Provisional application No. 61/780,433, filed on Mar. 13, 2013.

(51) Int. Cl.
| | |
|---|---|
| *E05D 7/00* | (2006.01) |
| *E05D 1/02* | (2006.01) |
| *G06F 1/16* | (2006.01) |

(52) U.S. Cl.
CPC .............. *E05D 7/00* (2013.01); *E05D 1/02* (2013.01); *G06F 1/1601* (2013.01); *G06F 1/163* (2013.01); *G06F 1/1626* (2013.01); *G06F 1/1652* (2013.01); *G06F 1/1681* (2013.01); *E05Y 2900/606* (2013.01)

(58) Field of Classification Search
CPC ...... G06F 1/1681; G06F 1/163; G06F 1/1652; E05D 7/00; E05D 1/02
See application file for complete search history.

(56) References Cited

U.S. PATENT DOCUMENTS

| | | | |
|---|---|---|---|
| 1,775,813 | A | 9/1930 | Colby |
| 1,957,156 | A | 5/1934 | Barth et al. |
| 2,050,901 | A | 8/1936 | Sundell |
| 2,638,523 | A | 5/1953 | Rubin |
| 2,834,158 | A | 5/1958 | Petermann |
| 2,990,616 | A | 7/1961 | Kuris et al. |
| 3,131,515 | A | 5/1964 | Mason |
| 3,535,955 | A | 10/1970 | Stanley et al. |
| 3,572,957 | A | 3/1971 | Strassberg |
| 3,802,040 | A | 4/1974 | Nomamoto |
| 3,814,016 | A | 6/1974 | Leach et al. |

(Continued)

FOREIGN PATENT DOCUMENTS

| | | |
|---|---|---|
| CN | 1163640 | 10/1997 |
| CN | 1210567 | 7/2005 |

(Continued)

OTHER PUBLICATIONS

Author Unknown, "3M Microspheres Innovative Solutions for Demanding Applications," 3M Innovations, 6 pages, 2004.

(Continued)

*Primary Examiner* — Nidhi Thaker
(74) *Attorney, Agent, or Firm* — David K. Cole

(57) ABSTRACT

An adjustable support structure including two parallel layers of flexible material separated by a coupling that maintains separation between the parallel layers such that the layers may easily displace in a parallel direction but not in a perpendicular direction. The adjustable support structure may also include a displacement brake to selectively resist or maintain parallel displacement of the layers.

20 Claims, 39 Drawing Sheets

(56) References Cited

U.S. PATENT DOCUMENTS

| | | |
|---|---|---|
| 3,957,715 A | 5/1976 | Lirones et al. |
| 4,343,846 A | 8/1982 | Kohn |
| 4,353,763 A | 10/1982 | Simons |
| 4,439,298 A | 3/1984 | Ford et al. |
| 4,467,168 A | 8/1984 | Morgan et al. |
| 4,622,091 A | 11/1986 | Letterman |
| 4,716,072 A | 12/1987 | Kim |
| 4,849,145 A | 7/1989 | Hirsch |
| 4,934,103 A | 6/1990 | Campergue et al. |
| 4,988,550 A | 1/1991 | Keyser et al. |
| 5,009,821 A | 4/1991 | Weaver |
| 5,052,153 A | 10/1991 | Wiand |
| 5,064,707 A | 11/1991 | Weaver et al. |
| 5,101,599 A | 4/1992 | Takabayasi et al. |
| 5,111,579 A | 5/1992 | Andersen |
| 5,116,138 A | 5/1992 | Macsenti et al. |
| 5,124,185 A | 6/1992 | Kerr et al. |
| 5,140,773 A | 8/1992 | Miwa et al. |
| 5,213,881 A | 5/1993 | Timmons et al. |
| 5,237,788 A | 8/1993 | Sandow |
| 5,249,534 A | 10/1993 | Sacks |
| 5,264,992 A | 11/1993 | Hogdahl et al. |
| 5,395,682 A | 3/1995 | Holland et al. |
| 5,416,953 A | 5/1995 | Hui |
| 5,439,330 A | 8/1995 | Bayer et al. |
| 5,442,470 A | 8/1995 | Hashimoto |
| 5,500,164 A | 3/1996 | Livesay et al. |
| 5,503,506 A | 4/1996 | Yuan |
| 5,556,670 A | 9/1996 | Mihara et al. |
| 5,617,377 A | 4/1997 | Perret |
| 5,619,889 A | 4/1997 | Jones et al. |
| 5,664,395 A | 9/1997 | Collins et al. |
| 5,755,539 A | 5/1998 | Takeuchi et al. |
| 5,850,914 A | 12/1998 | Patterson et al. |
| 5,865,569 A | 2/1999 | Holstein et al. |
| 5,879,492 A | 3/1999 | Reis et al. |
| 5,906,873 A | 5/1999 | Kim |
| 5,967,357 A | 10/1999 | Kellogg et al. |
| 5,984,600 A | 11/1999 | Gierth |
| 6,117,517 A | 9/2000 | Diaz et al. |
| 6,117,546 A | 9/2000 | Geiman et al. |
| 6,179,943 B1 | 1/2001 | Welch et al. |
| 6,193,089 B1 | 2/2001 | Yu |
| 6,213,669 B1 | 4/2001 | Yamamoto |
| 6,267,036 B1 | 7/2001 | Lani |
| 6,276,100 B1 | 8/2001 | Woll et al. |
| 6,299,246 B1 | 10/2001 | Tomka |
| 6,435,363 B2 | 8/2002 | Fingerhut et al. |
| 6,437,238 B1 | 8/2002 | Annerino et al. |
| 6,464,195 B1 | 10/2002 | Hildebrandt |
| 6,588,969 B2 | 7/2003 | Hawkins |
| 6,689,246 B2 | 2/2004 | Hirahara et al. |
| 6,703,519 B1 | 3/2004 | Buvat et al. |
| 6,775,908 B2 | 8/2004 | Chara et al. |
| 6,846,221 B2 | 1/2005 | Ulrich et al. |
| 6,871,527 B2 | 3/2005 | Hansma et al. |
| 6,889,411 B2 | 5/2005 | Hinkley et al. |
| 6,973,815 B2 | 12/2005 | Bryans et al. |
| 7,029,267 B2 | 4/2006 | Caron et al. |
| 7,063,763 B2 | 6/2006 | Chapman, Jr. |
| 7,068,343 B2 | 6/2006 | Saitoh |
| 7,097,371 B2 | 8/2006 | Hasunuma et al. |
| 7,115,323 B2 | 10/2006 | Westre et al. |
| 7,191,555 B2 | 3/2007 | Hughes |
| 7,209,114 B2 * | 4/2007 | Radley-Smith ...... A44C 5/0007 345/156 |
| 7,238,089 B2 | 7/2007 | Tsumuraya et al. |
| 7,326,012 B2 | 2/2008 | Schlotter |
| 7,338,235 B2 | 3/2008 | Weghaus et al. |
| 7,354,350 B2 | 4/2008 | Glimpel |
| 7,393,577 B2 | 7/2008 | Day et al. |
| 7,436,653 B2 | 10/2008 | Yang et al. |
| 7,503,368 B2 | 3/2009 | Chapman et al. |
| 7,527,321 B1 | 5/2009 | Benderoth et al. |
| 7,533,906 B2 | 5/2009 | Luettgen et al. |
| 7,545,628 B2 | 6/2009 | Takuma |
| 7,560,152 B2 | 7/2009 | Rajabali et al. |
| 7,571,828 B2 | 8/2009 | Palley et al. |
| 7,588,970 B2 | 9/2009 | Ohnuma |
| 7,628,879 B2 | 12/2009 | Ackerman |
| 7,710,728 B2 | 5/2010 | Arisaka et al. |
| 7,735,644 B2 | 6/2010 | Sirichai |
| 7,762,028 B2 | 7/2010 | Valentz et al. |
| 7,790,637 B2 | 9/2010 | DiFonzo et al. |
| 7,934,676 B2 | 5/2011 | Dufresne et al. |
| 7,963,483 B2 | 6/2011 | Roming et al. |
| 7,971,400 B2 | 7/2011 | Boldt et al. |
| 7,988,532 B2 | 8/2011 | Choo et al. |
| 8,005,521 B2 * | 8/2011 | Cho ................. H04M 1/0216 379/433.13 |
| 3,023,260 A1 | 9/2011 | Filson et al. |
| 8,021,752 B2 | 9/2011 | Honda et al. |
| 8,031,186 B2 | 10/2011 | Ostergaard |
| 8,042,770 B2 | 10/2011 | Martin et al. |
| 8,096,859 B2 | 1/2012 | Schimweg |
| 8,252,133 B2 | 8/2012 | Feng et al. |
| 8,317,257 B2 | 11/2012 | Rolfe et al. |
| 8,324,515 B2 | 12/2012 | Stevenson et al. |
| 8,325,094 B2 | 12/2012 | Ayala Vazquez et al. |
| 8,372,495 B2 | 2/2013 | Kenney |
| 8,408,972 B2 | 4/2013 | Kenney |
| 8,419,883 B2 | 4/2013 | Day et al. |
| 8,511,498 B2 | 8/2013 | Kenney |
| 8,562,886 B2 | 10/2013 | DiFonzo |
| 3,691,037 A1 | 4/2014 | Ingram et al. |
| 8,776,358 B2 | 7/2014 | Gotham et al. |
| 10,020,462 B1 * | 7/2018 | Ai ........................ H01L 51/524 |
| 2002/0172783 A1 | 11/2002 | Hawkins et al. |
| 2002/0195742 A1 | 12/2002 | Beck et al. |
| 2003/0078070 A1 | 4/2003 | Hsu |
| 2004/0171321 A1 | 9/2004 | Plant |
| 2004/0197519 A1 | 10/2004 | Elzey et al. |
| 2005/0097717 A1 | 5/2005 | Rasmussen |
| 2005/0117193 A1 | 6/2005 | Poll et al. |
| 2005/0142369 A1 | 6/2005 | Canady et al. |
| 2005/0145759 A1 | 7/2005 | Shih |
| 2006/0207212 A1 | 9/2006 | Durney |
| 2007/0117600 A1 * | 5/2007 | Robertson, Jr. ...... H04M 1/0216 455/575.3 |
| 2007/0134466 A1 | 6/2007 | Rajaram et al. |
| 2008/0090477 A1 | 4/2008 | Balthes et al. |
| 2008/0094372 A1 | 4/2008 | Philipp |
| 2008/0125195 A1 * | 5/2008 | Maenpaa ............ H04M 1/0216 455/575.3 |
| 2008/0169380 A1 | 7/2008 | Jackson et al. |
| 2009/0041984 A1 | 2/2009 | Mayers et al. |
| 2009/0142157 A1 | 6/2009 | Wang et al. |
| 2009/0208721 A1 | 8/2009 | Tsuchiya et al. |
| 2009/0267266 A1 | 10/2009 | Lee et al. |
| 2010/0144406 A1 * | 6/2010 | Ozawa ................. G06F 1/1618 455/575.3 |
| 2010/0233424 A1 | 9/2010 | Dan-Jumbo et al. |
| 2010/0289390 A1 | 11/2010 | Kenney |
| 2010/0315299 A1 | 12/2010 | Bibl et al. |
| 2011/0050509 A1 | 3/2011 | Ayala Vasquez et al. |
| 2011/0163642 A1 | 7/2011 | Rohrbach et al. |
| 2012/0003454 A1 | 1/2012 | Younes |
| 2012/0021196 A1 | 1/2012 | Kenney |
| 2012/0147592 A1 | 6/2012 | Takase |
| 2012/0222985 A1 | 9/2012 | Kenney et al. |
| 2012/0314400 A1 * | 12/2012 | Bohn ..................... G09F 9/301 362/97.1 |
| 2013/0148288 A1 | 6/2013 | Kenney |
| 2013/0273295 A1 | 10/2013 | Kenney et al. |
| 2014/0123436 A1 * | 5/2014 | Griffin ................ H04M 1/0216 16/221 |
| 2015/0174854 A1 | 6/2015 | Siahaan et al. |
| 2015/0378391 A1 * | 12/2015 | Huitema ................. G06F 1/163 361/679.03 |

(56) References Cited

U.S. PATENT DOCUMENTS

2016/0037625 A1\* 2/2016 Huitema ................ H05K 1/028
                                                                                         361/749

FOREIGN PATENT DOCUMENTS

| CN | 1989281 | 6/2007 |
|---|---|---|
| CN | 101092944 | 12/2007 |
| CN | 101200828 | 6/2008 |
| CN | 102471944 | 5/2014 |
| DE | 10123400 | 2/2002 |
| EP | 1139638 | 10/2001 |
| EP | 2047983 | 4/2009 |
| EP | 2051572 | 4/2009 |
| JP | 2006123475 | 5/2006 |
| JP | 2007076202 | 3/2007 |
| JP | 2007186228 | 7/2007 |
| JP | 2009000843 | 1/2009 |
| JP | 2010115732 | 5/2010 |
| WO | WO98/15404 | 4/1998 |
| WO | WO2008/133748 | 11/2008 |
| WO | WO2009/017571 | 5/2009 |

OTHER PUBLICATIONS

Huawei Watch Review—SlashGear accessed Feb. 2, 2017.
merriam-webster.com/dictionary/housing.com.
merriam-webster.com/dictionary/overlap.com.

\* cited by examiner

STIFF FABRIC

This application is a continuation of U.S. patent application Ser. No. 14/202,639, filed Mar. 10, 2014, which claims the benefit of provisional patent application No. 61/780,433, filed Mar. 13, 2013, which are hereby incorporated by reference in their entireties.

TECHNICAL FIELD

The present disclosure relates generally to apparatuses for providing adjustable structural support, and more particularly, apparatuses adapted for use in adjustable structural support of electronic devices.

BACKGROUND

Common articulating hinges pivotally couple various components to a central axis about which attachment members can pivot to incrementally increase or decrease angles. Such hinges may also forcibly resist changes in opening angle, such as with a friction clutch or interlocking teeth. Articulating hinges with the capability to forcibly resist changes in angle have been used for adjustable support for such electronic devices as laptop screens and desktop monitors. Further, articulating hinges are often aesthetically displeasing due to the large number of components.

Common living hinges are generally constructed of a flexible material that is intentionally weakened at a central location between attachment members either by thinning, perforation, or other similar process. Living hinges are less expensive than articulating hinges to produce, but suffer from material fatigue from repeated use. Further, living hinges are incapable of providing and forcible resistance to change in shape. A exemplary living hinge may be found in foldable table covers and cases.

Accordingly, there may be a need for an adjustable structure that does not require a substantial number of components, is aesthetically pleasing, provides structural support, and does not experience material fatigue from repeated use.

SUMMARY

In various embodiments the present disclosure relates to adjustable support structures comprising at least two layers of flexible material, at least one coupling adapted to maintain a fixed distance in a perpendicular direction between the at least two layers, a displacement brake adapted to selectively resist or maintain displacement in a parallel direction of the at least two layers, wherein the at least two layers are adapted to elastically deform from a first position to a second position and return to the first position without experiencing material fatigue.

In some embodiments, the adjustable structure also comprises at least one rigid fixture adapted to resist all displacement of the two layers of flexible material.

Some embodiments further comprise a displacement brake which itself comprises at least two friction pads adapted to apply compressive force to the at least two layers of flexible material.

Some embodiments further comprise at least one of the layers constructed with a number of oblong apertures which may receive a number of different types of coupling. In some embodiments, the oblong apertures may receive a threading material. In other embodiments the oblong apertures may receive a plurality of bonding bands. In other embodiments the oblong apertures may receive rivets, the rivets in some embodiments having been inserted through each layer, or in further embodiments having been inserted through each layer and intermediate layers positioned between the flexible layers.

In some embodiments, the coupling may comprise a low durometer elastomer.

In some embodiments, the coupling may comprise complimentary and longitudinally-interlocking surface geometries of the layers of flexible material.

Some embodiments further comprise a displacement brake is positioned along the breadth of one longitudinal end of the coupled layers and a rigid fixture is positioned along the breadth of the opposite longitudinal end of the coupled layers.

Some embodiments further comprise a first displacement brake is positioned along the breadth of one longitudinal end of the coupled layers, and a second displacement brake is positioned along the breadth of the opposite longitudinal end of the coupled layers.

In some embodiments, the layers of flexible material may be constructed of nitinol.

Some embodiments further comprise electronic cabling concealed between the layers of flexible material.

In further embodiments, the adjustable structure further comprises at least two layers of flexible material, at least one coupling adapted to maintain a fixed distance in a perpendicular direction between the at least two layers, a plurality of displacement brakes adapted to selectively resist or maintain displacement in a parallel direction of the at least two layers, wherein the at least two layers are adapted to elastically deform from a first geometry to a second geometry and return to the first geometry without experiencing material fatigue and further wherein the plurality of displacement brakes are distributed throughout the adjustable support structure.

DETAILED DESCRIPTION

Figure 1A:
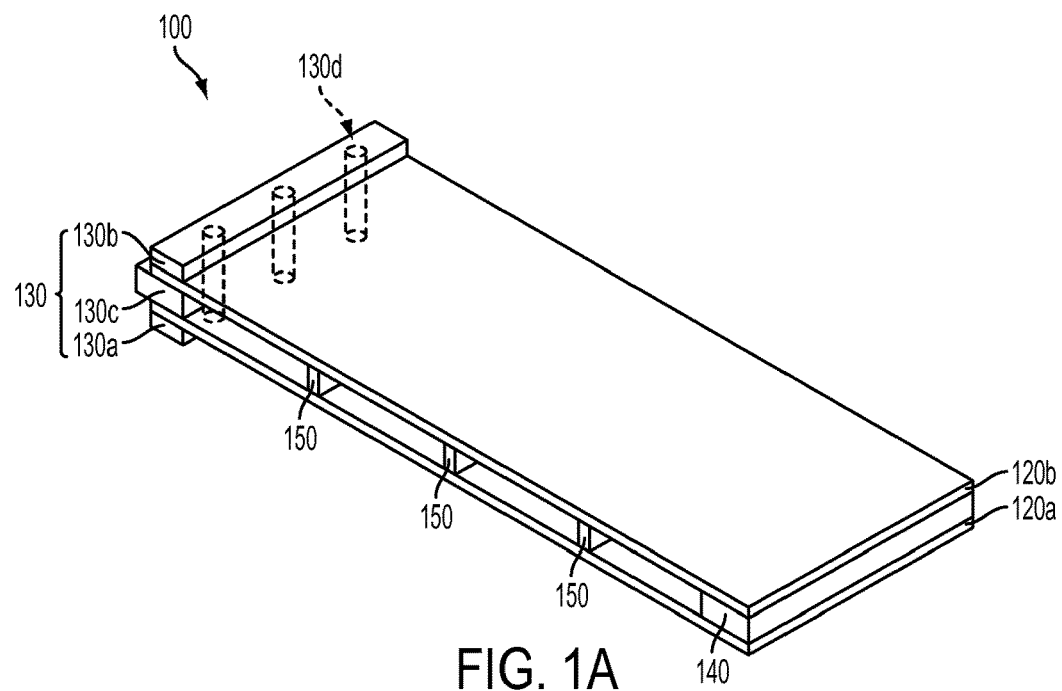
FIG. 1A is a parallel perspective illustration of an adjustable support structure embodiment in a relaxed position.

This disclosure details various embodiments of an adjustable support structure that may be repeatedly and selectively deformed to an arbitrary shape thereafter rigidly retaining the arbitrary shape against load forces and elastic restoring forces without experiencing material fatigue. The structure can be incorporated into any device requiring adjustable support such as a laptop screen hinge, tablet computer cases, camera tripods, or desktop screen stands.

The use of the same or similar reference numerals in different figures indicates similar, related, or identical items.

Generally, the adjustable structure described herein may include two rectangular and parallel layers of flexible material that are joined by a partially flexible coupling positioned between the layers. The coupling permits the layers to longitudinally displace while it prevents the layers from perpendicular displacement. Along the breadth of one longitudinal end, the coupled layers are prevented from all displacement by a rigid fixture. Along the breadth of the opposite longitudinal end the coupled layers are permitted to longitudinally displace only against compressive friction provided by a displacement brake.

In this configuration when a bending force is applied to the adjustable structure, the layers bend along different radii which in turn encourages the layers to longitudinally displace in different directions. The layer bent along the larger radius (i.e. outer layer) is encouraged to retract within the displacement brake at the same time the layer bent along the smaller radius (i.e. inner layer) is encouraged to extend through the displacement brake. When the bending force is removed, compressive friction of the displacement brake retains the extension and retraction of the layers, which in turn retains the deformation of the structure. Any load force may be applied to the deformed structure such that the sum of the load force and elastic restoring force of the structure itself are less than the bending force applied to initially deform the structure.

FIG. 1A is a parallel perspective illustration of an adjustable support structure 100 in a relaxed position. Rectangular and flexible layers 120a and 120b are positioned such that the upper layer 120b is aligned with all edges of lower layer 120a. The layers 120a-b may be constructed of any number of materials including but not limited to metals, glasses, plastics or other flexible and semi-flexible materials. The coupling 150 permits the layers 120a and 120b to longitudinally displace while it prevents the layers 120a and 120b from perpendicular displacement. In the illustrated embodiment, longitudinal displacement refers to displacement parallel to the length or breadth of the layers 120a-b, and perpendicular displacement refers to an increase or decrease in distance between layers 120a-b. In a preferred embodiment, the coupling 150 prevents longitudinal displacement along the breadth of the coupled layers 120a-b, such that the coupling 150 only permits longitudinal displacement along the length of the structure, resisting displacement in any other direction.

Along the breadth of one longitudinal end of the structure 100 the coupled layers 120a-b are prevented from all displacement by a rigid fixture 140, which bonds upper layer 120b to lower layer 120a. Along the breadth of the longitudinal end opposite rigid fixture 140 the coupled layers 120a-b are permitted to longitudinally displace against compressive friction provided by displacement brake 130. Displacement brake 130 may include three components: upper friction pad 130b, lower friction pad 130a, and interior friction pad 130c. Compressive friction is provided to upper layer 120b by upper friction pad 130b and interior friction pad 130c. Compressive friction is provided to lower layer 120a by lower friction pad 130a and interior friction pad 130c. Not shown in the illustrated embodiment is structure which couples the separate components of displacement brake 130 together, but upon reading the disclosure one will appreciate such structure is beneficial to prevent unwanted displacement of the displacement brake. As illustrated in FIG. 1A, support structure 100 is at rest.

Figure 1B:
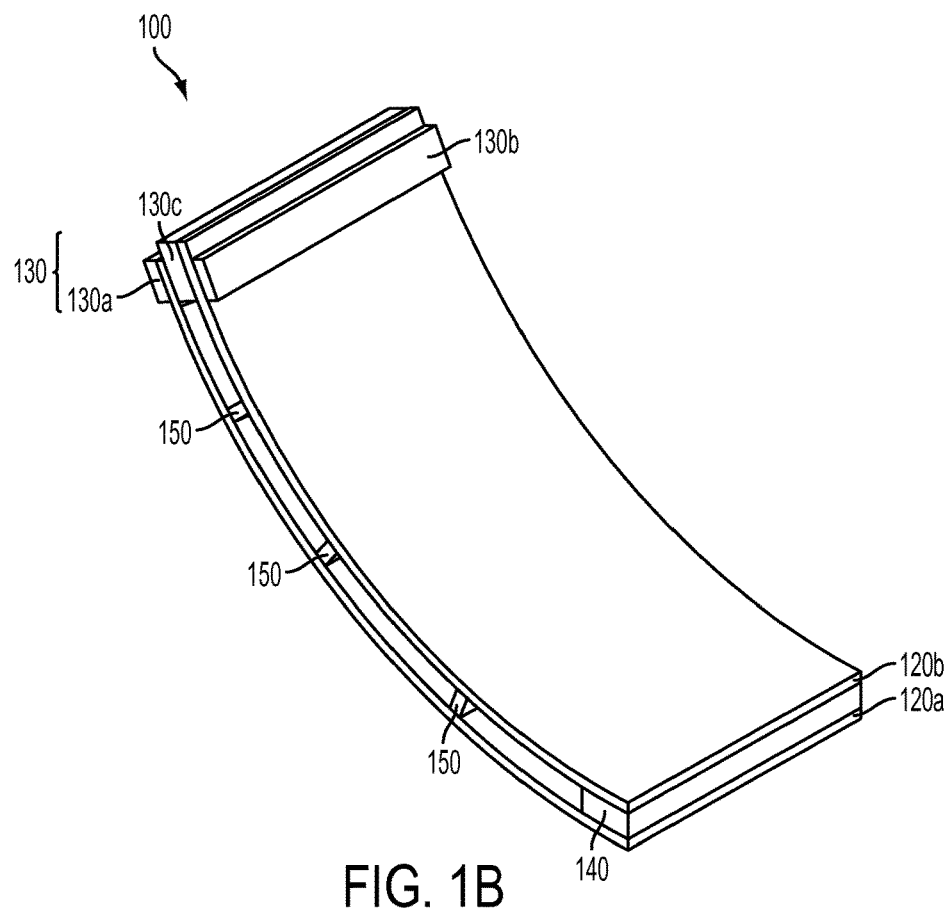
FIG. 1B is a parallel perspective illustration of an adjustable support structure embodiment in a flexed position.
Figure 1C:
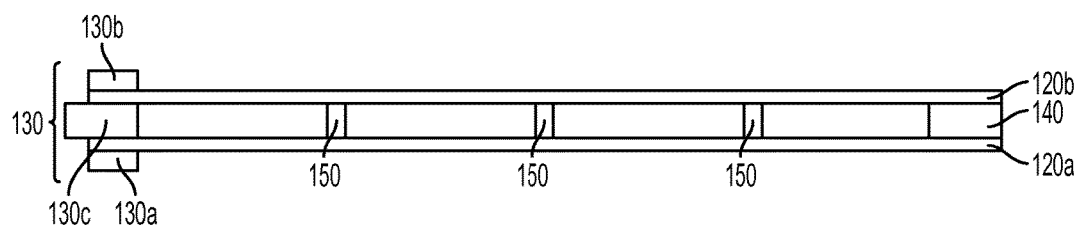
FIG. 1C is a longitudinal cross section counterpart to FIG. 1A.
Figure 1D:
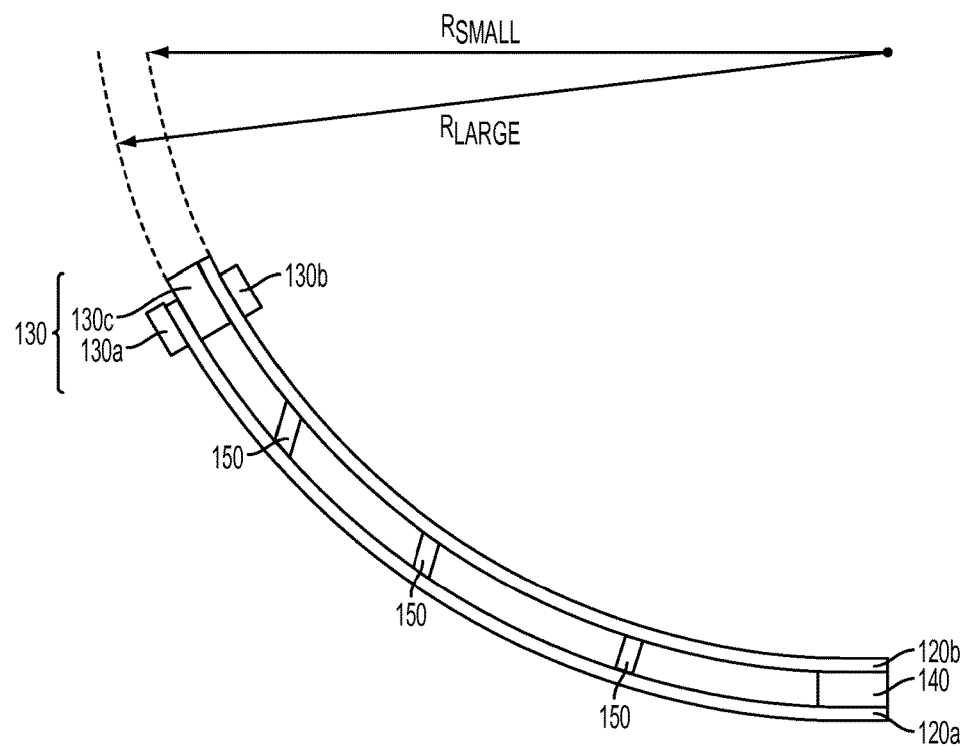
FIG. 1D is a longitudinal cross section counterpart to FIG. 1B.
Figure 1E:
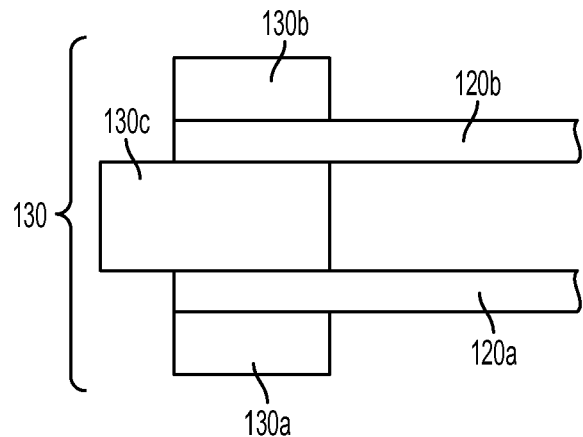
FIG. 1E is a detailed cross section view of a compressive brake in a relaxed position counterpart to the embodiment shown in FIG. 1A and FIG. 1C.
Figure 1F:
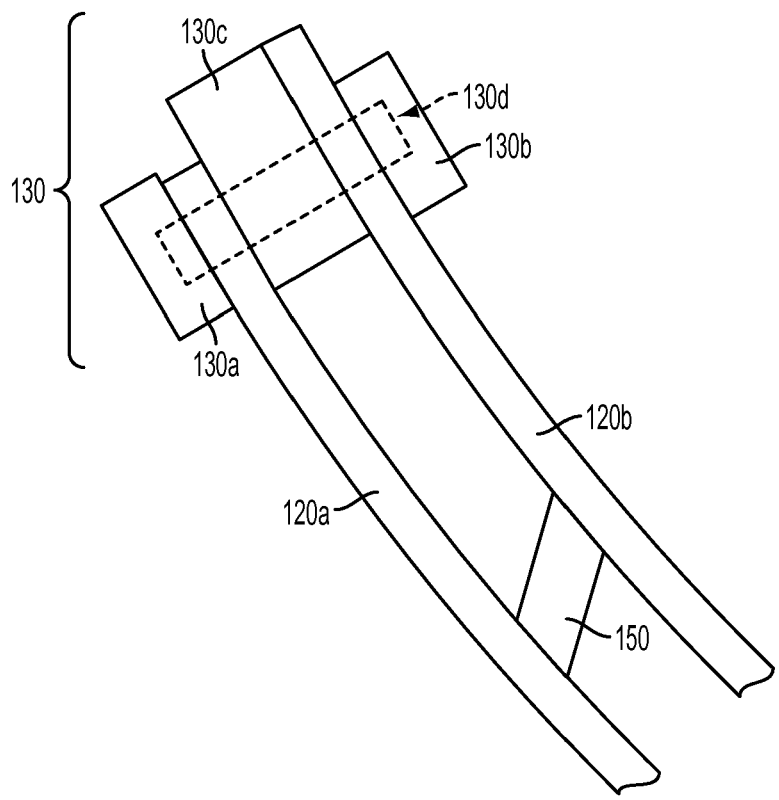
FIG. 1F is a detailed cross section view of a compressive brake in a flexed position counterpart to the embodiment shown in FIG. 1B and FIG. 1D.
Figure 1G:
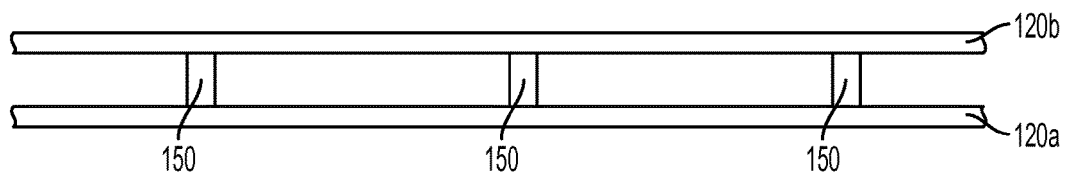
FIG. 1G is a detailed cross section view of a coupling between substantially parallel layers of flexible material in a relaxed position counterpart to the embodiment shown in FIG. 1A and FIG. 1C.
Figure 1H:
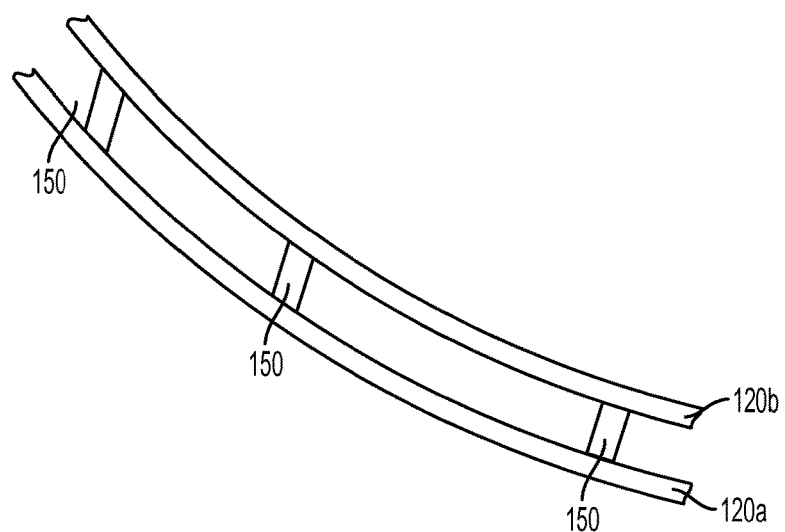
FIG. 1H is a detailed cross section view of a coupling between substantially parallel layers of flexible material in a flexed position counterpart to the embodiment shown in FIG. 1B and FIG. 1D.
Figure 1I:
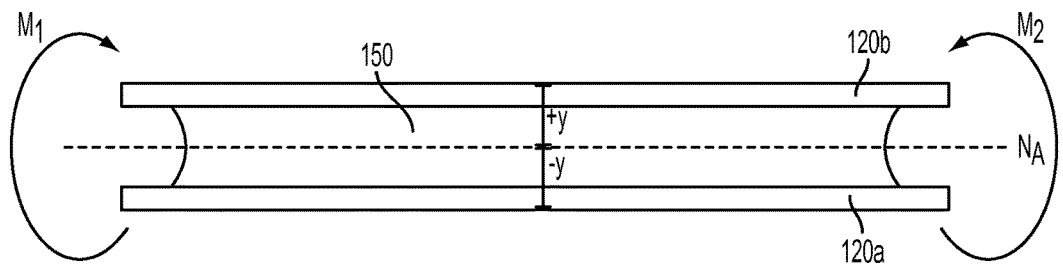
FIG. 1I is a cross section force diagram showing equal and opposite bending moments applied to an adjustable support structure, showing the neutral axis centered between the layers.
Figure 1J:
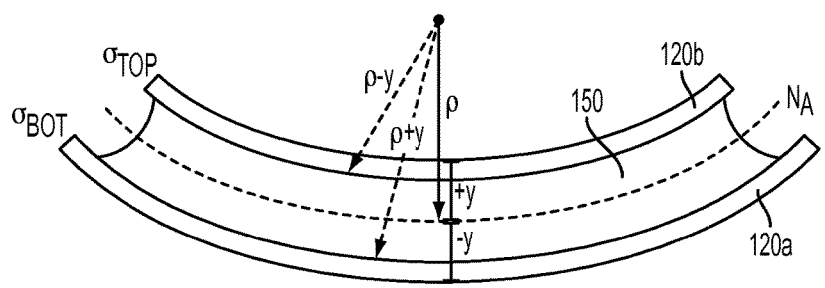
FIG. 1J is a bent cross section force diagram showing the effect of equal and opposite bending moments applied to an adjustable support structure, showing the neutral axis centered between the layers.
Figure 1K:
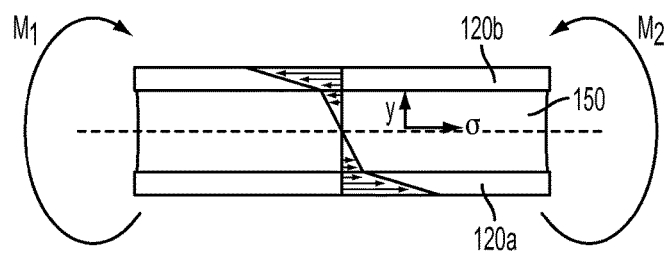
FIG. 1K is a diagram showing the distribution of stress and strain within a composite structure when equal and opposite bending moments are applied.

Referring briefly now to FIG. 1I, structure 100 of FIG. 1A can be modeled as a composite structure composed of three layers of material, namely upper layer 120b, coupling 150, and lower layer 120a. These layers are flexible, and as shown in FIG. 1I, when equal and opposite moments M1 and M2 are applied to the composite structure, the structure may bend in response. FIG. 1J illustrates the composite structure in a bent position. Because the structure of FIG. 1I has a rectangular and symmetrical cross section, the neutral axis $N_A$ of the composite structure is exactly half the distance between layers 120a-b, illustrated as ±y. When the composite structure is bent along radius ρ (determined by distance to the neutral axis), upper layer 120b bends along radius ρ−y and lower layer 120a bends along radius ρ+y. Bending along different radii produces different bending stresses a, shown as $\sigma_{top}$ for upper layer 120b and $\sigma_{bot}$ for lower layer 120a. A generalized distribution of bending stress σ is illustrated in FIG. 1K, showing a negative (compressive) bending stress through upper layer 120b and a positive (expansive) bending stress through lower layer 120a. Thus, when a moment is applied to the composite structure 100, one will appreciate that the larger radius (ρ+y) layer experiences expansion forces, and the smaller radius (ρ−y) experiences compressive forces. A skilled reader will appreciate that in the illustrated embodiment there are two major force application points between which compression and expansion forces are felt within the materials of each layer—between the geometrical center of the displacement brake and the interior edge of the fixture.

When an external force such as the bending moment illustrated in FIGS. 1I-1K is applied to structure 100 of FIG. 1A, structure 100 may deform to the position as shown in FIG. 1B. As shown, the flexible coupling 150 prevented upper layer 120b and lower layer 120a from displacement in the perpendicular direction; the layers remain parallel over the distance between the fixture 140 and displacement brake 130. As shown, upper layer 120b deforms along a smaller radius than lower layer 120a. Accordingly, upper layer 120b experiences a compressive force from the applied moment, and the lower layer 120a experiences an expansion force from the applied moment. Because fixture 140 prevents any displacement, the compression force and expansion force of the upper and lower layers respectively must concentrate at displacement brake 130. When the compression force is greater than force of friction applied by upper friction pad 130b and interior friction pad 130c, upper layer 120b may slide in an outward direction through displacement brake 130 in order to counter the force of compression. Similarly, when the expansion force of lower layer 120a is greater than the force of friction applied by lower friction pad 130a and interior friction pad 130c, lower layer 120a may slide in an inward direction through displacement brake 130 in order to counter the force of expansion. Accordingly, when the upper layer 120b slides within displacement brake 130 in response to the compressive force, the surface distance of upper layer 120b between force application points of displacement brake 130 and fixture 140 reduces. When the distance between force application points, reduces the compressive force is relieved. Similarly, when the lower layer 120a slides into displacement brake 130 in response to the expansion force, the surface distance of upper layer 120a between force application points of displacement brake 130 and fixture 140 increases. When the distance between force application points increases, the expansion force is relieved.

Although the described embodiment has both a fixture and displacement brake, in further embodiments, the fixture may be replaced with a second displacement brake. However, one having read this disclosure will appreciate that replacing all displacement brakes with fixtures will prevent the structure from maintaining a deformed position.

In further embodiments, the structure may bend to other angles than that shown, both negative and positive from the relaxed position shown in FIG. 1A.

In further embodiments, the moment may also be applied to either end of the structure, and that if the coupling between layers permits, the structure may be twisted as well.

In further embodiments, the layers may take non-rectangular or distinct shapes. For instance, a potential embodiment similar to FIG. 1A may include oblong layers, elliptical layers, an layer divided into strips with the other layer being solid, or any number of other layer shape configurations.

A structure like the embodiment described above will retain its deformed position after a moment has been applied and released if the force of friction within the displacement brake is sufficient to prevent the elastic resistance forces from sliding the upper 120b and lower 120a layers within the displacement brake 130. A reader of skill will further appreciate that a secondary applied force can deform the structure a second time, placing the structure 100 into a new position, or returning the structure 100 to the resting position shown in FIG. 1A. However, if the secondary applied force is of insufficient magnitude, one of skill will appreciate that the structure will retain its position. An insufficient secondary force may be called a load force.

One will appreciate that modifying the force of friction is easily accomplished by controlling the pressure exerted on either layer by the upper friction pad and the lower friction pad. Higher friction pressure by either of these pads means that greater longitudinal resistive forces are required, which in turn necessitates a greater friction and expansion force, which in turn requires a larger applied force. As disclosed in this embodiment, the amount of compressive force exerted by the friction pads directly controls the amount of applied force it takes to deflect the structure. Thus, the displacement brake can be tuned in any number of ways to provide a force of friction that is easily overcome with an applied force but that is greater than resistance forces present in the system after deformation. A skilled reader will further appreciate that for any given structure, there is a wide range of tolerable levels of friction and that the amount of friction applied by the brake is a matter of design choice.

Complimenting FIGS. 1A-1B are FIGS. 1C-1G showing longitudinal cross sections of the same embodiment. Emphasized in cross sections 1C and 1D are the differences in the deflection radius of the upper and lower layers, labeled $R_{SMALL}$ and $R_{LARGE}$.

FIGS. 1E and 1F are detailed cross section view of the compressive brake in a relaxed and flexed position counterpart to the embodiment shown in FIG. 1B and FIG. 1D. Here, displacement brake 130 is shown supplying a compressive force between upper friction pad 130b, interior friction pad 130c, and lower friction pad 130a. Also visible is a detail of outward displacement of the small radius upper layer 120b.

Counterpart to FIGS. 1E and 1F are detail FIGS. 1G and 1H illustrating that the coupling 150 between the upper 120b and lower 120a layers maintains substantial parallelism between the layers regardless of the amount of deflection the apparatus 100 undergoes.

FIG. 1H is a detailed cross section view of a coupling between substantially parallel layers of flexible material in a flexed position counterpart to the embodiment shown in FIG. 1B and FIG. 1D.

In another embodiment, the coupling between the flexible layers may be a threading between the several layers, as shown in FIGS. 2A-2D. Aligning upper layer 220b and lower layer 220a, may cause a plurality of oblong apertures 270 cut into the respective layers to also align. The apertures must be oblong such that the stitching material 250 is free to slide. The stitching material 250 can be stitched through the apertures 270 to join the flexible layers 220. In the embodiment shown, there is no central layer between the flexible layers. Accordingly, both the rigid fixture 240 and the displacement brake 230 operate only externally. As such, in this embodiment, an internal friction pad is not necessary, as the layers 220a and 220b will exert frictional forces upon each other given the friction provided through upper friction pad 230b and lower friction pad 230a.

One of ordinary skill in the art will appreciate that the embodiment shown in FIGS. 2A-2D does not necessarily require the stitching material 250 to be wrapped. The flexible layers 220a and 220b may be coupled, for instance, by weaving two or more lengths of stitching material together through the several oblong apertures 270. A woven coupling as described as illustrated in FIGS. 2E-2F. In a further embodiment, the flexible layers 220a and 220b may be coupled together with a longitudinal banding 280 as shown in FIGS. 2G-2J. In a preferred embodiment, the longitudinal banding is longitudinal so as to allow flexible layers 220a and 220b to slide along one another in only the longitudinal direction.

Figure 2A:
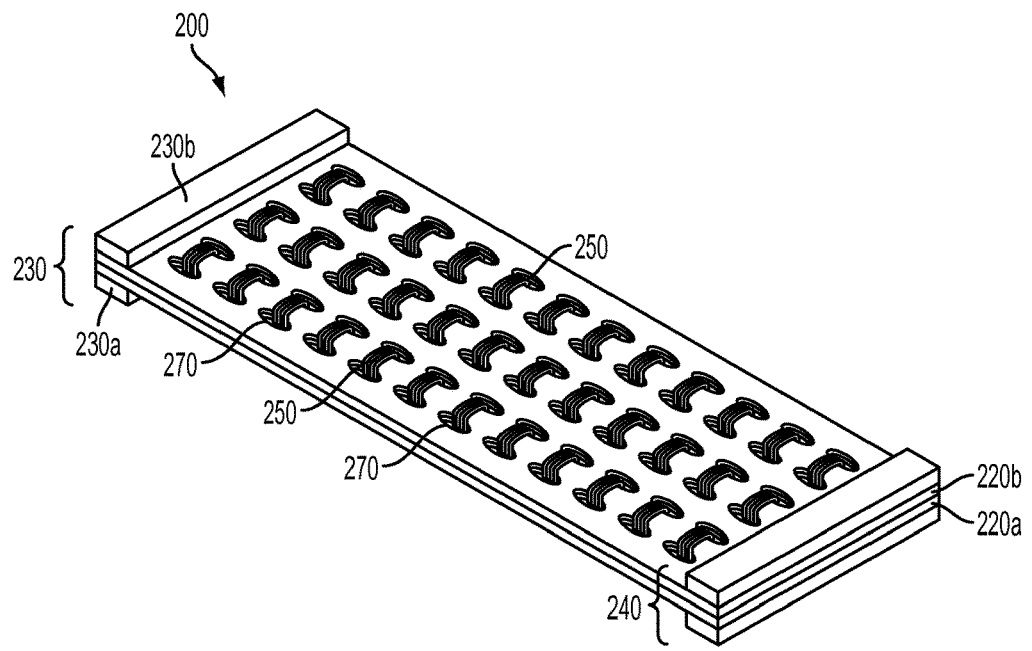
FIG. 2A is a parallel perspective illustration of an embodiment of an adjustable support structure with a pair of substantially parallel layers coupled together with looped thread in a relaxed position.
Figure 2B:
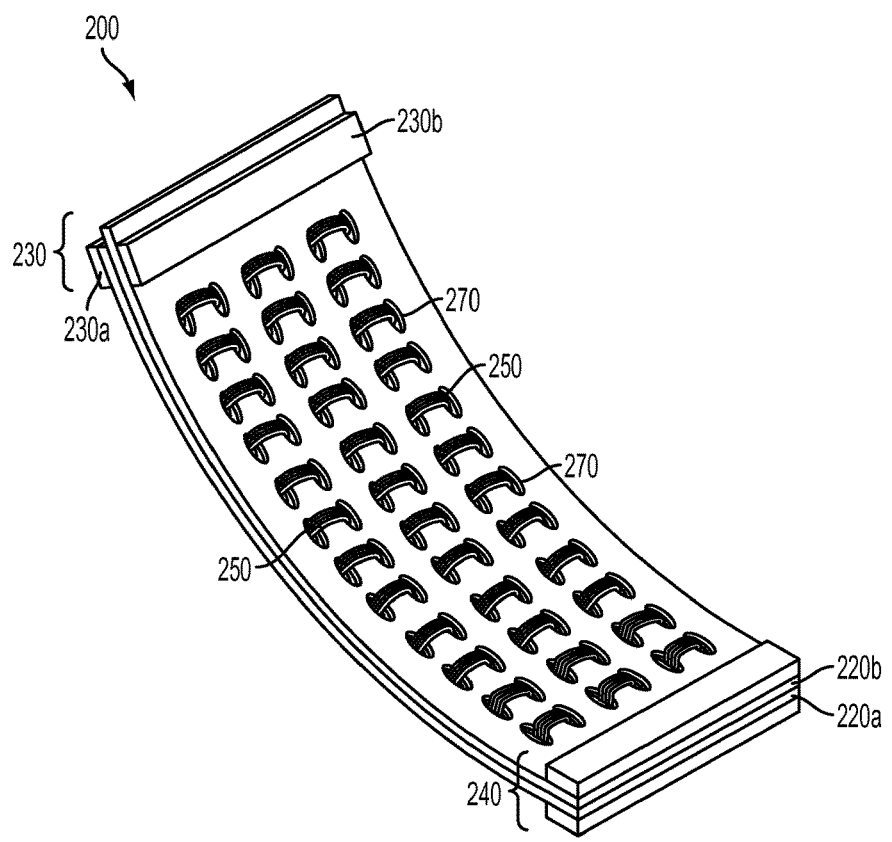
FIG. 2B is a parallel perspective illustration of an embodiment of an adjustable support structure with a pair of substantially parallel layers coupled together with looped thread in a flexed position.
Figure 2C:
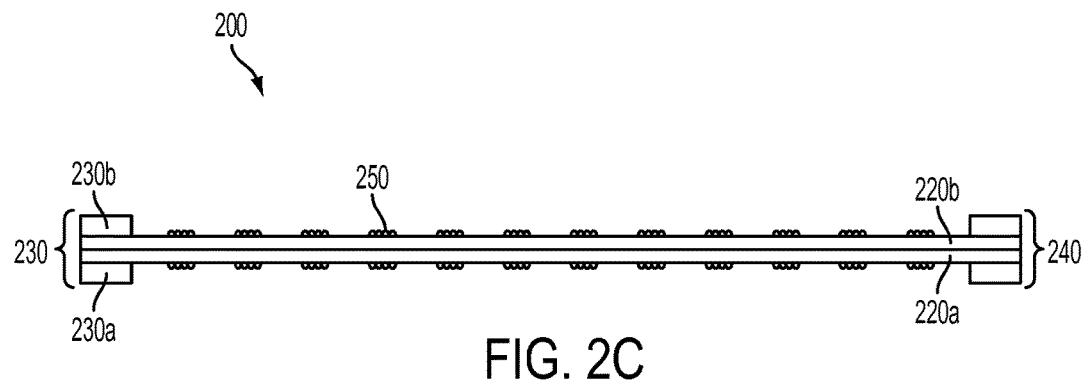
FIG. 2C is a longitudinal cross section counterpart to FIG. 2A.
Figure 2D:
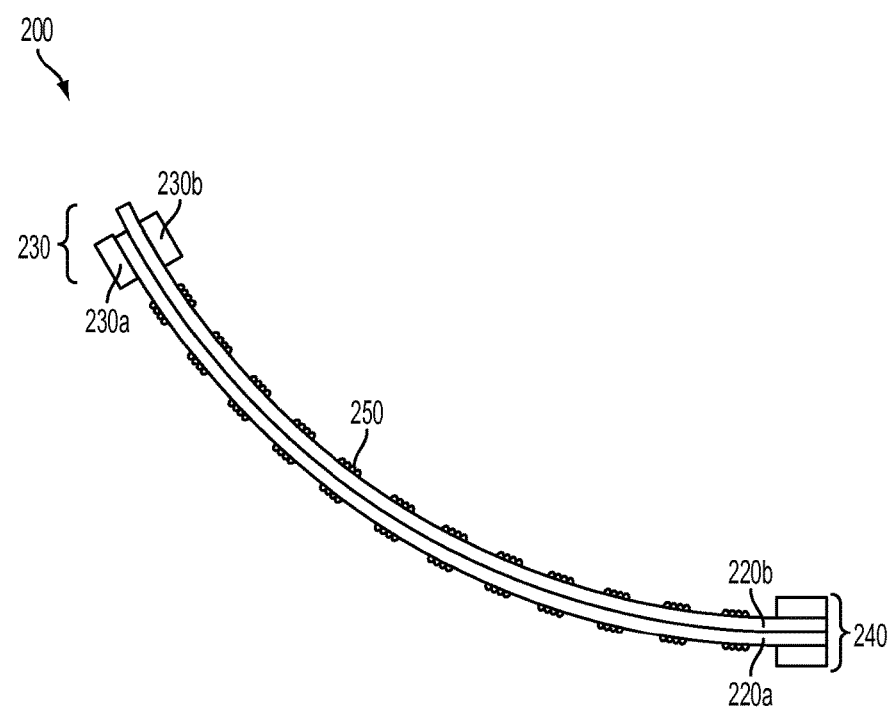
FIG. 2D is a longitudinal cross section counterpart to FIG. 2B.
Figure 2E:
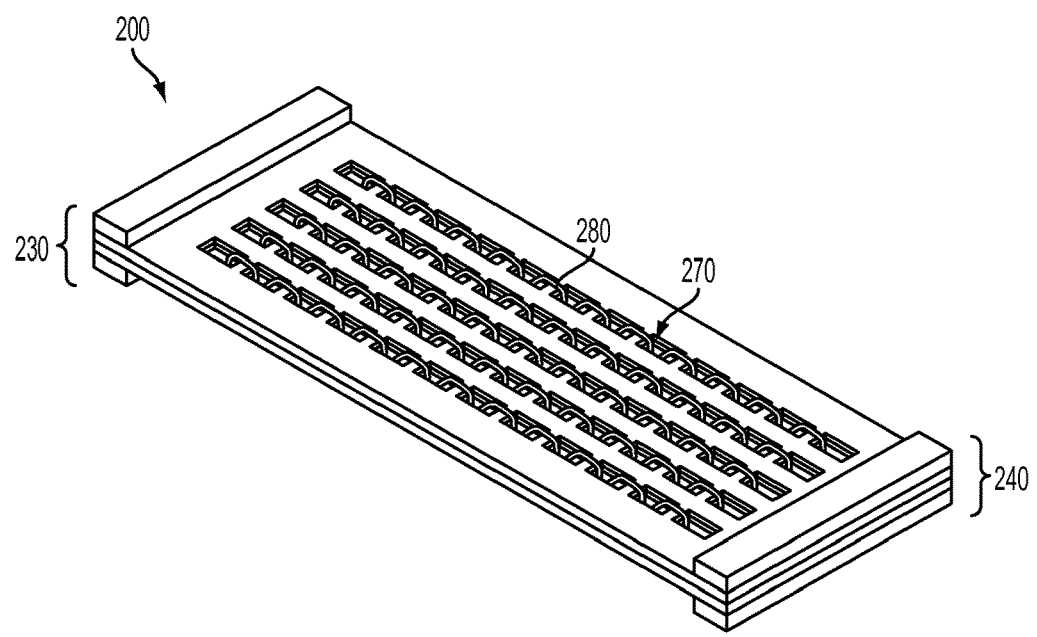
FIGS. 2E-2F show a similar embodiment to FIGS. 2A-2B, where the coupling threads are woven throughout.
Figure 2F:
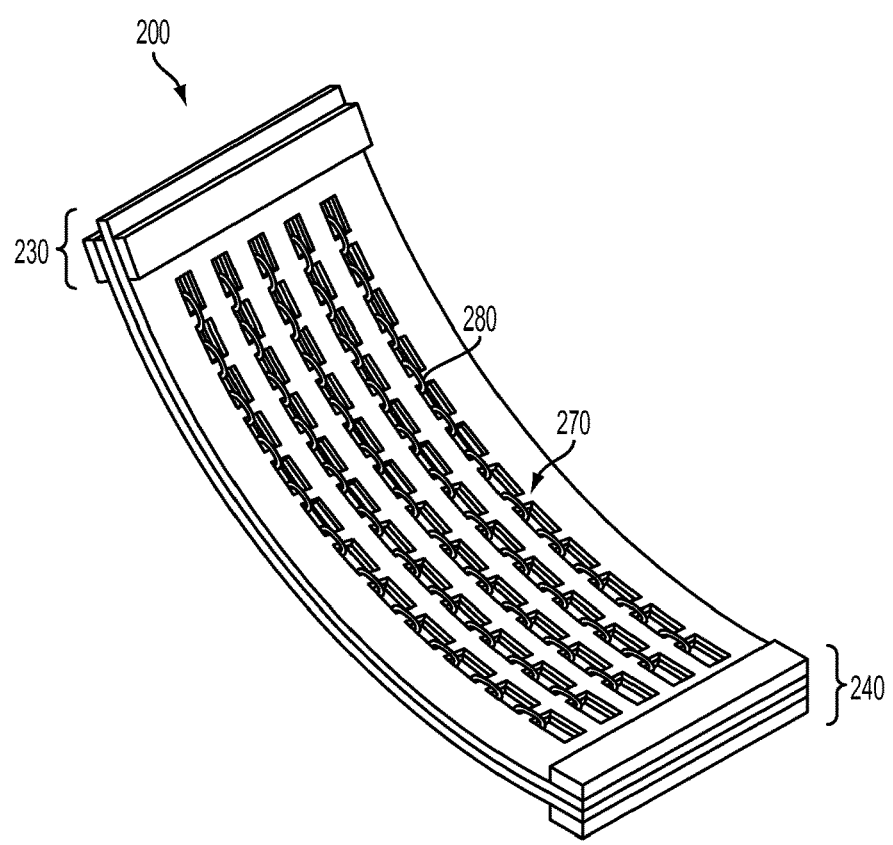
Figure 2G:
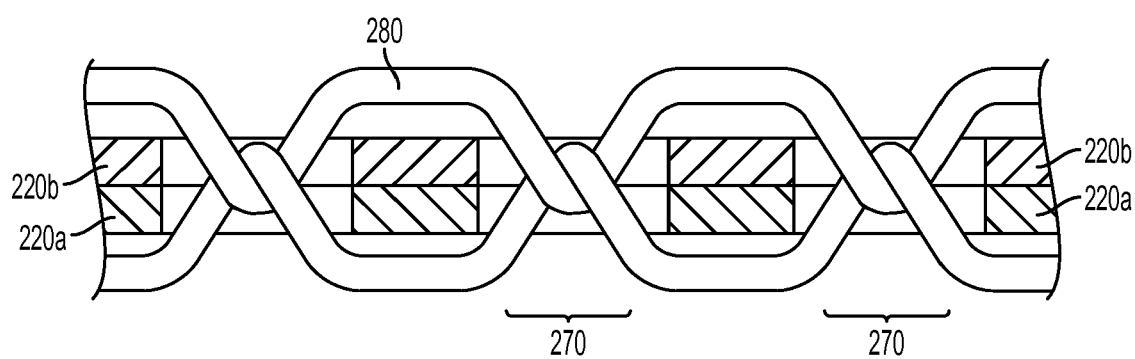
FIG. 2G shows a detail view of the banding shown in FIGS. 2E-2F
Figure 2H:
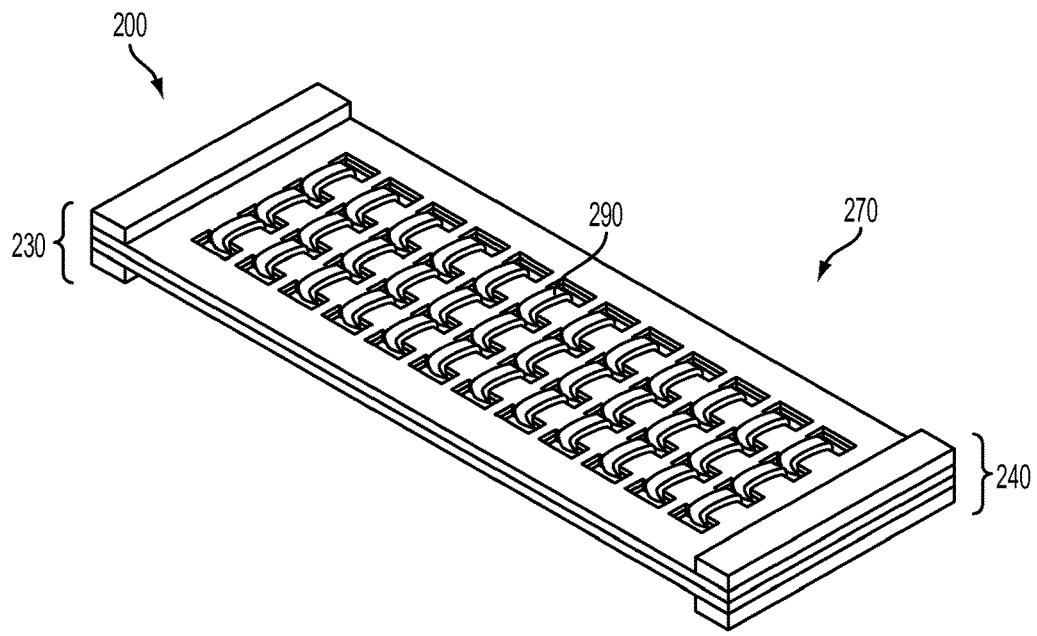
FIG. 2H shows a similar embodiment to those of FIGS. 2A-2B, 2E-2F, where the coupling comprises a band of material, shown in a relaxed position.
Figure 2I:
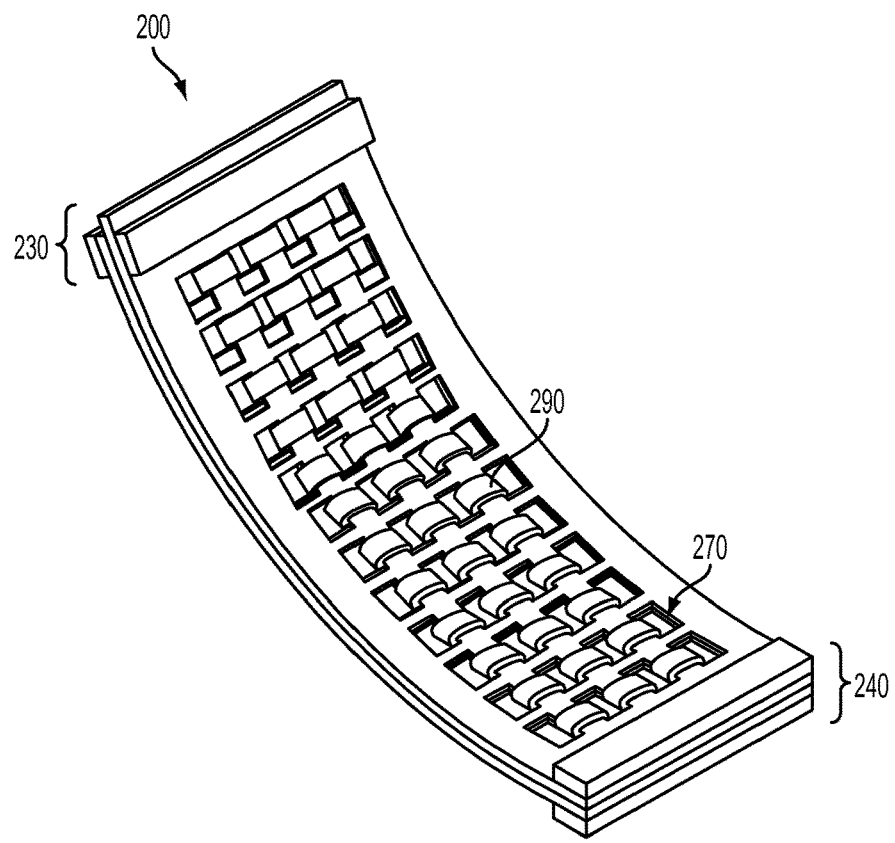
FIG. 2I is a parallel perspective illustration of the embodiment of FIG. 2H in a flexed position.
Figure 2J:
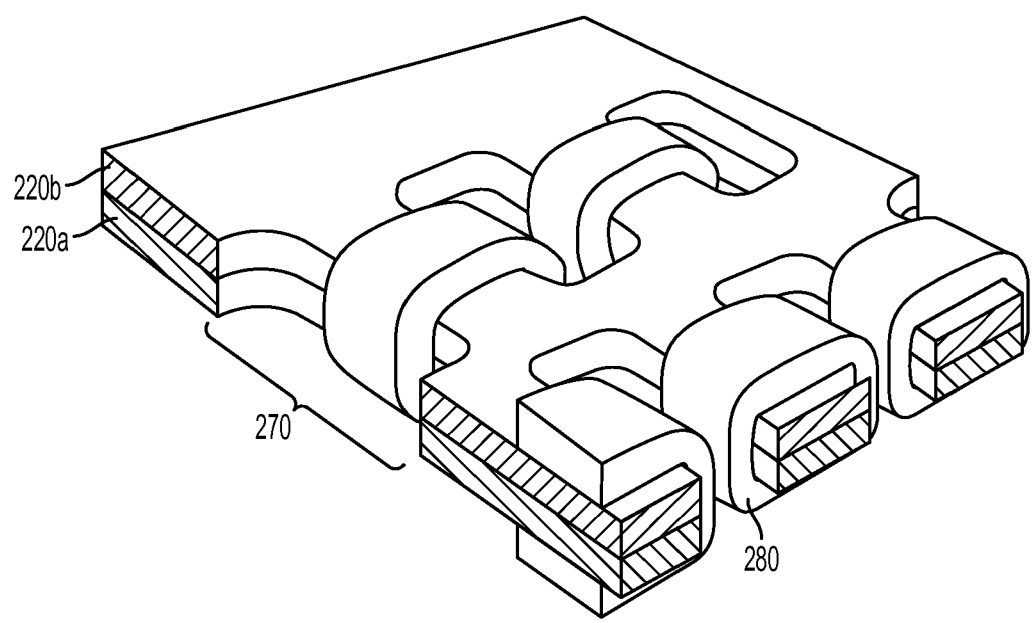
FIG. 2J shows a detail view of the banding shown in FIGS. 2H-2I.

In another embodiment, the coupling between the flexible layers may be accomplished with slideable rivets fastened to oblong apertures similar to those in the embodiments shown in FIG. 2A. In FIGS. 3A-3D, aligning upper layer 320b and lower layer 320a, may cause a plurality of oblong longitudinal apertures 370 cut into the respective layers to also align. Through the longitudinal apertures 370 a slideable rivet 350 may be fastened. In a first embodiment, the rivets may only be able to slide through the longitudinal apertures of one layer, being rigidly attached to the layer opposite. In a second embodiment, the rivets may be able to slide through the longitudinal apertures through any layer. One of skill will further recognize that the length of the oblong apertures 370 will directly control the maximum deflection of the apparatus 300. In a first position, the rivets 350 may sit generally in the center of the oblong apertures 370. In a second position, after the longitudinal friction and expansion forces have been overcome in at least one of the small radius or large radius flexible layers, the rivets 350 may slide along the aperture in the direction of the friction or expansion. As the deformation of the apparatus 300 continues, the rivets 350 continue to slide until they come into contact with the edge of the longitudinal apertures. At this point, one having read this disclosure will appreciate that the apparatus will deflect no further.

Figure 3A:
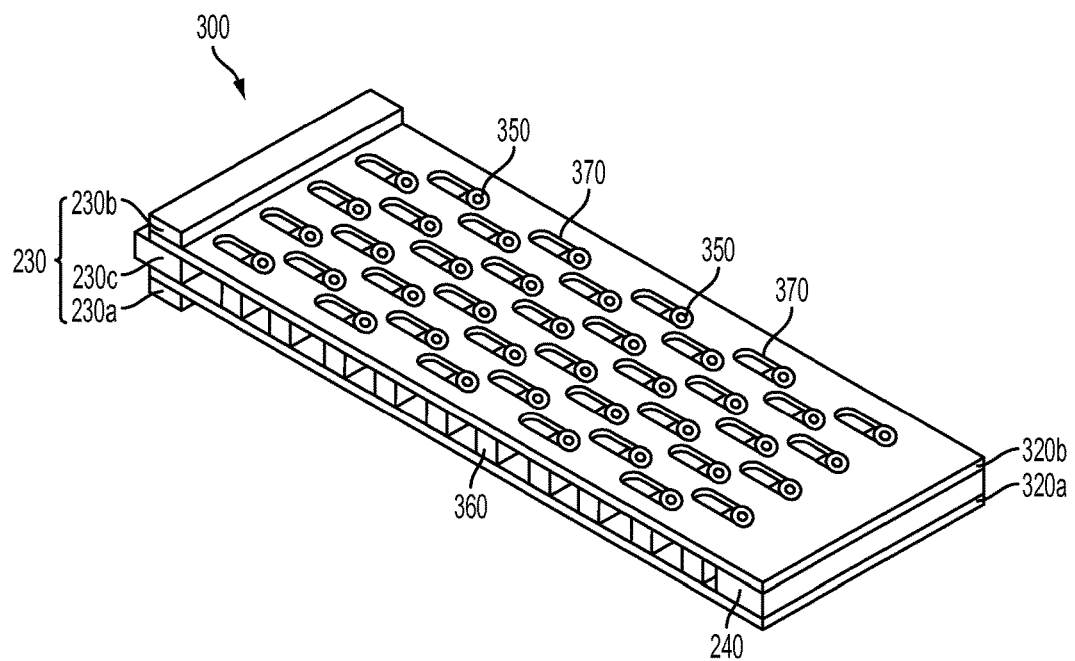
FIG. 3A is a parallel perspective illustration of an embodiment of an adjustable support structure in a relaxed position with a pair of substantially parallel layers coupled with rivets permitted to slide longitudinally through oblong-shaped apertures.
Figure 3B:
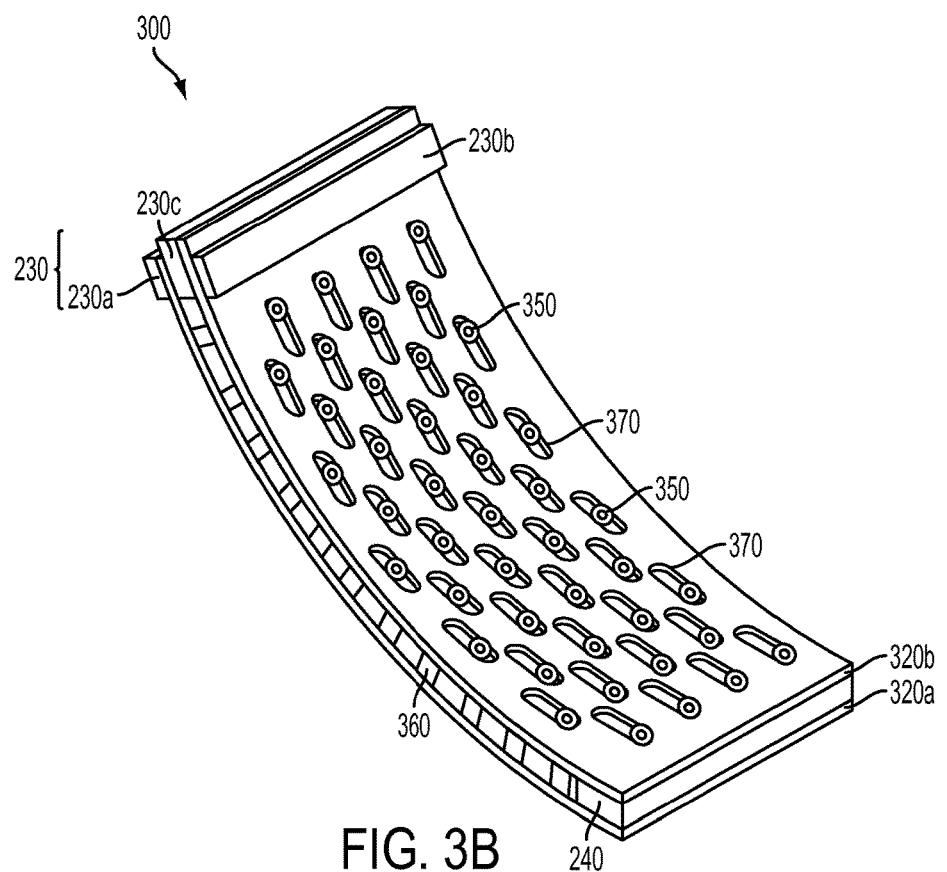
FIG. 3B is a parallel perspective illustration of the embodiment of FIG. 3A in a flexed position showing that the rivets slide upon flexing of the structure.
Figure 3C:
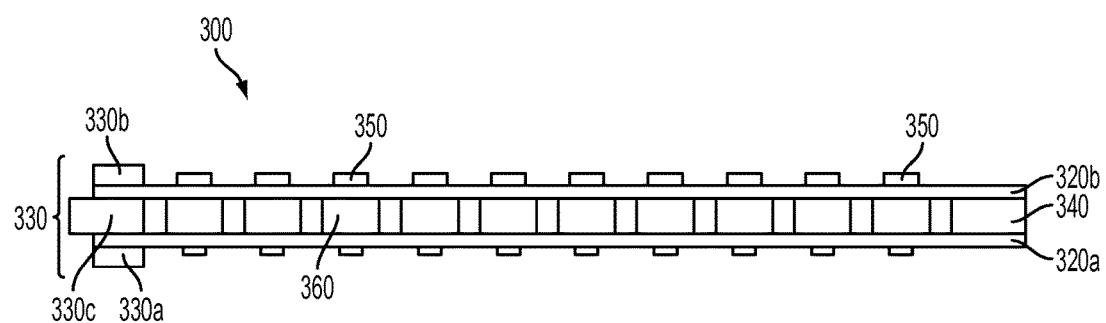
FIG. 3C is a longitudinal cross section counterpart to FIG. 3A.
Figure 3D:
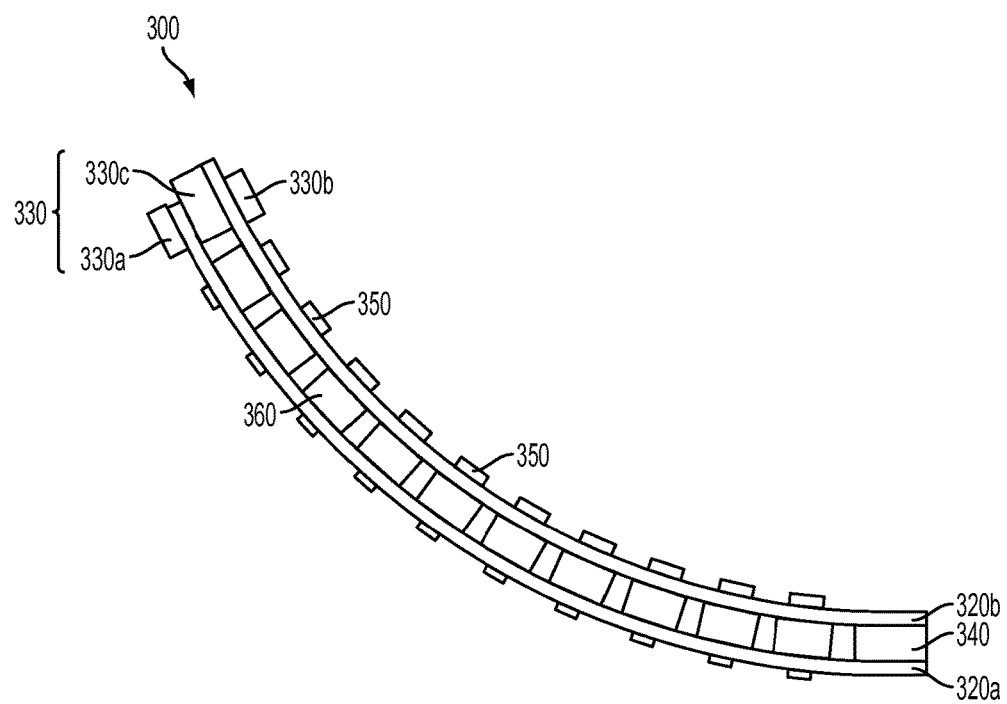
FIG. 3D is a longitudinal cross section counterpart to FIG. 3B.
Figure 3E:
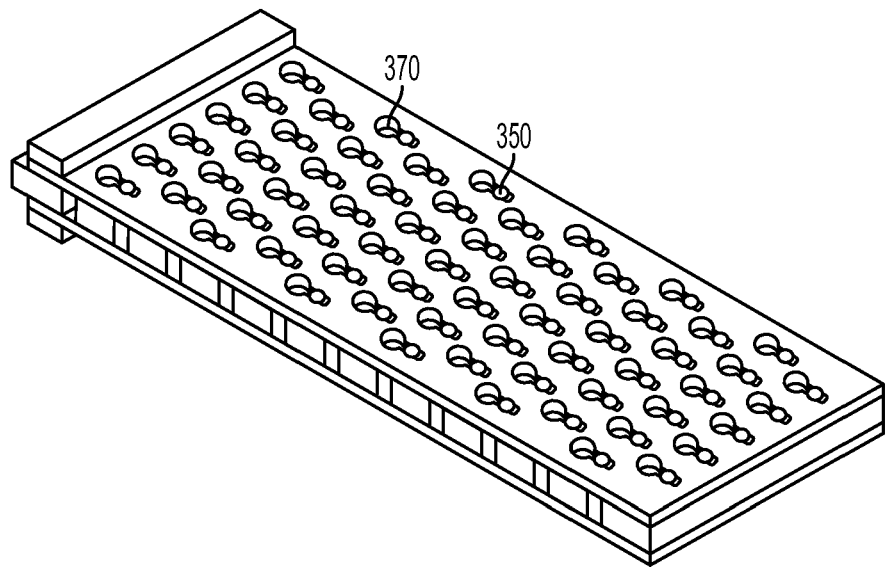
FIG. 3E is a parallel perspective illustration of an embodiment of an adjustable support structure in a relaxed position with a pair of substantially parallel layers coupled with rivets permitted to slide longitudinally through arbitrarily-shaped apertures.
Figure 3F:
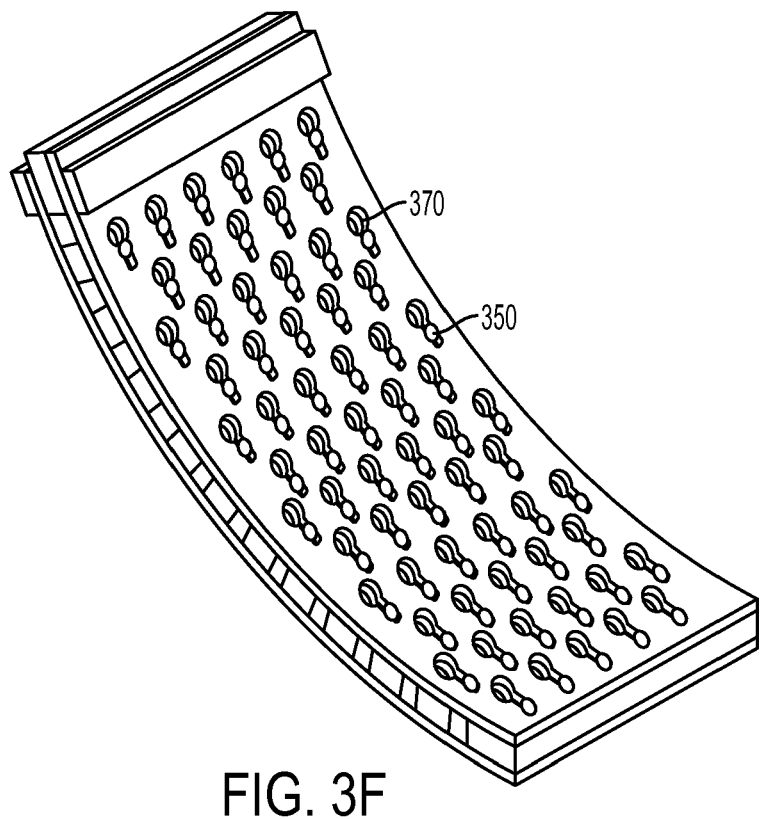
FIG. 3F is a parallel perspective illustration of the embodiment of FIG. 3E in a flexed position showing that the rivets slide upon flexing of the structure.
Figure 3G:
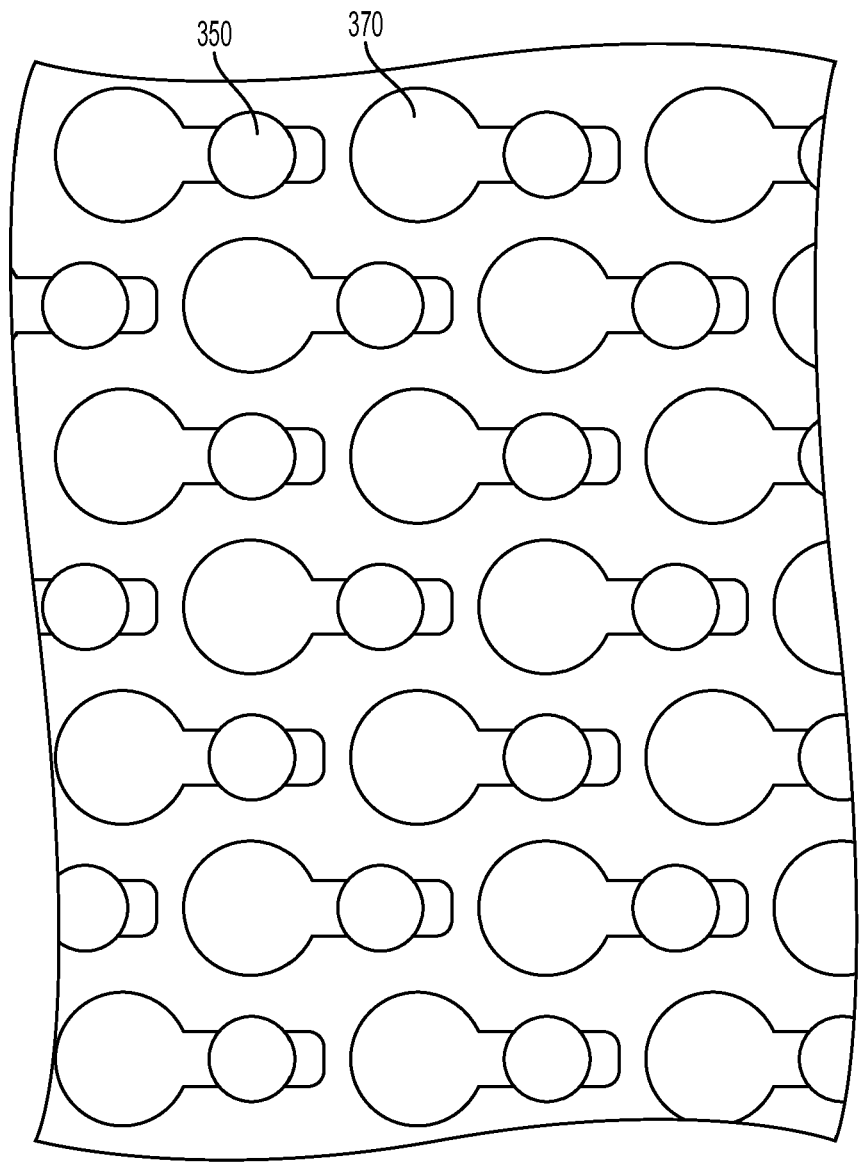
FIG. 3G is a longitudinal cross section counterpart to FIG. 3E.
Figure 4A:
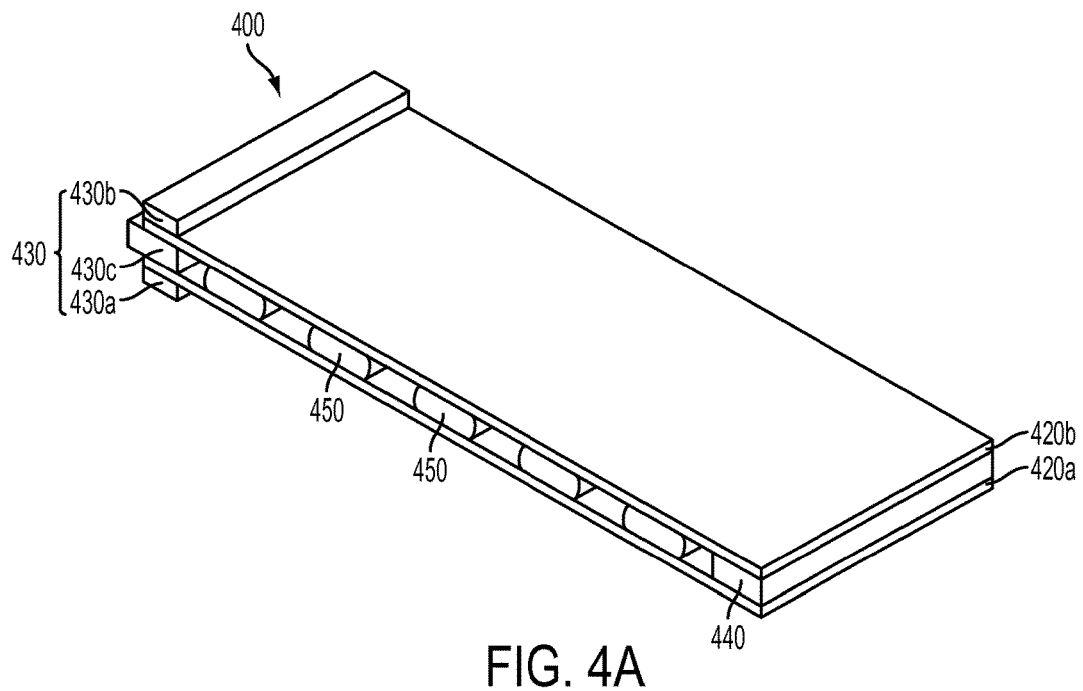
FIG. 4A is a parallel perspective illustration of an embodiment of an adjustable support structure in a relaxed position with a pair of substantially parallel layers coupled with a plurality of regions of a low durometer elastomer.
Figure 4B:
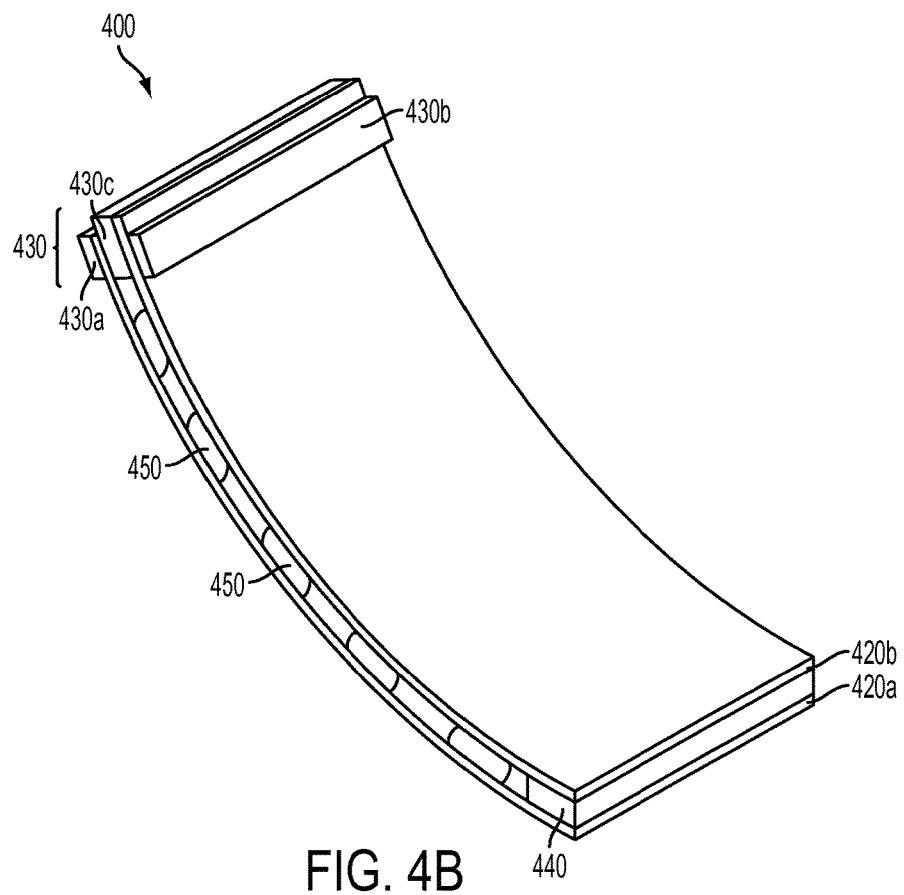
FIG. 4B is a parallel perspective illustration of the embodiment of FIG. 4A in a flexed position showing that the low durometer elastomer regions deform longitudinally while maintaining consistent distance between the substantially parallel layers upon flexing of the structure.
Figure 4C:
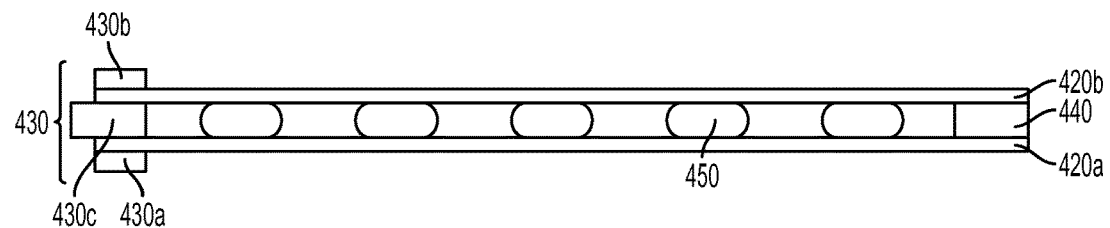
FIG. 4C is a longitudinal cross section counterpart to FIG. 4A.
Figure 4D:
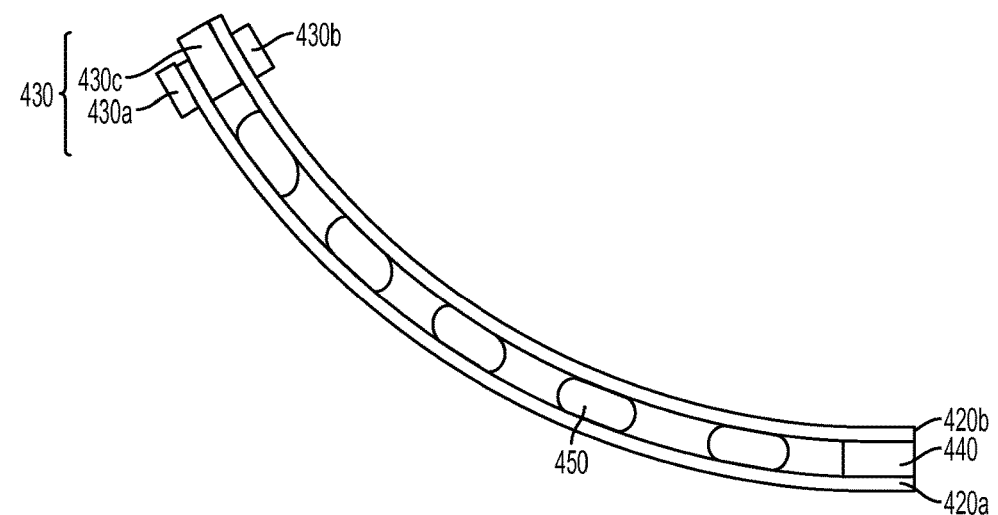
FIG. 4D is a longitudinal cross section counterpart to FIG. 4B.
Figure 5A:
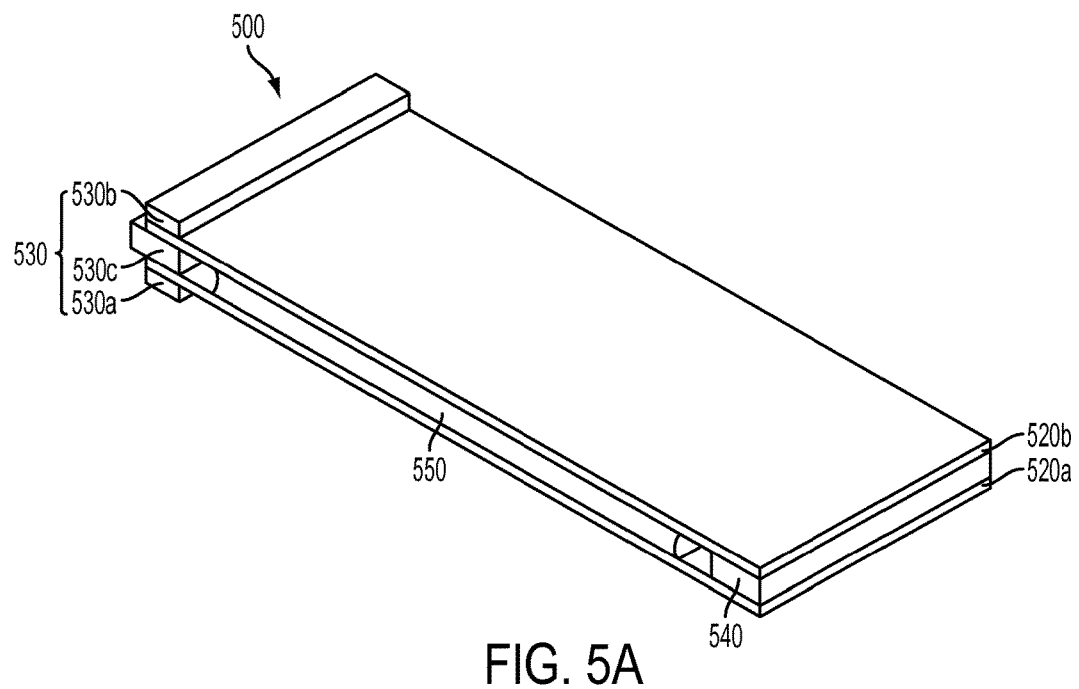
FIG. 5A is a parallel perspective illustration of an embodiment of an adjustable support structure in a relaxed position with a pair of substantially parallel layers coupled with a single region of a low durometer elastomer.
Figure 5B:
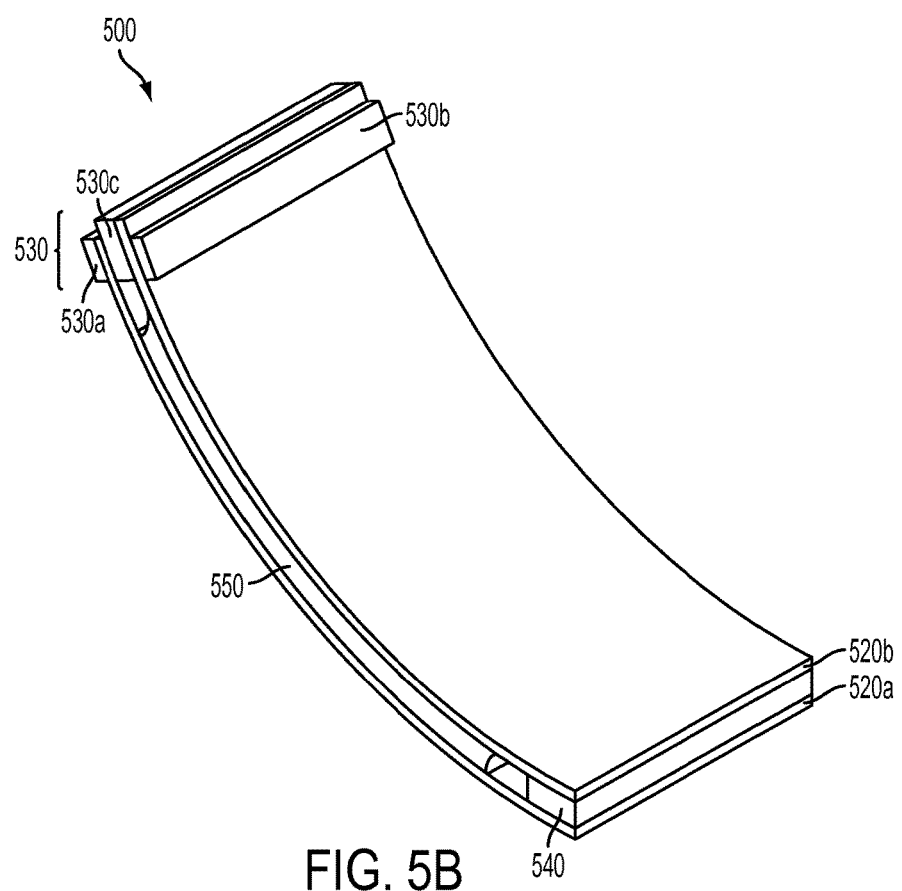
FIG. 5B is a parallel perspective illustration of the embodiment of FIG. 5A in a flexed position showing that the low durometer elastomer deforms longitudinally upon flexing of the structure.
Figure 5C:
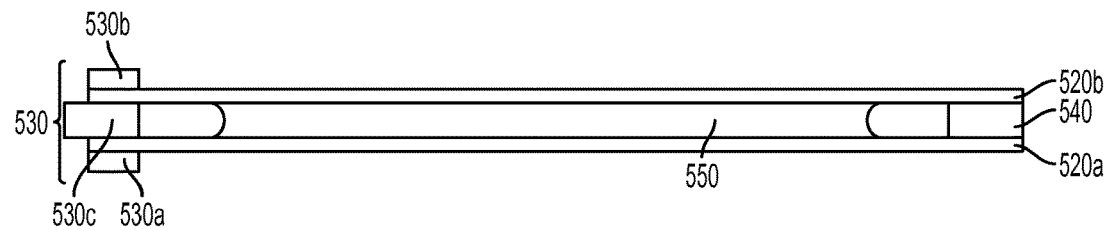
FIG. 5C is a longitudinal cross section counterpart to FIG. 5A.
Figure 5D:
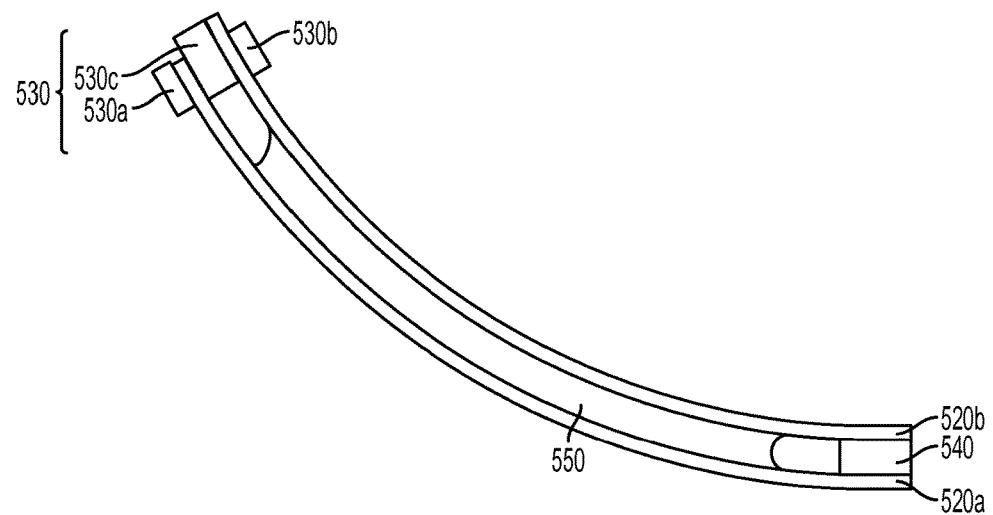
FIG. 5D is a longitudinal cross section counterpart to FIG. 5B.

In a further embodiment similar to that illustrated in FIGS. 3A-3D, the apertures 370 through which the rivets are fastened may be of an arbitrary but substantially longitudinal shape. FIGS. 3E-3G illustrate such an embodiment.

In the embodiment shown in FIGS. 3A-3G, an intermediate layer may be placed between the upper and lower layers. The rivets 350 may extend through the intermediate layer 360. One having read this disclosure will appreciate that the dimensions of the intermediate layer 360 define the amount of separation between the upper layer and the lower layer. One of skill will further appreciate that the intermediate layer may be constructed of a low friction material so that the rivets may slide within the apertures without substantial resistance.

In a further embodiment, the flexible coupling between the layers may be provided by a plurality of regions of low durometer elastomer. FIGS. 4A-4D demonstrate such an embodiment. In this case, the low durometer elastomer 450 permits the flexible layers 420a and 420b to slide in the parallel direction while maintaining substantial parallelism between the layers. The open areas between the plurality of regions may serve as housing for any number of components the user requires. For example, the open areas may guide electronic cabling, serve as tubing for gasses or liquids, or any other user requirement. One having read this disclosure will recognize that the actual durometer of the elastomer selected depends on the application the apparatus 400 is intended for. In other words, the more rigid the elastomer between the flexible layers, the more resistive the apparatus 400 will be to deflection.

In a further embodiment, the flexible coupling between the layers may be provided by a single of regions of low durometer elastomer. FIGS. 5A-5D demonstrate such an embodiment. In this case, the low durometer elastomer 550 permits the flexible layers 520a and 520b to slide in the parallel direction while maintaining substantial parallelism between the layers, as shown also in FIGS. 4A-4D. As with embodiments previously described, one having read this disclosure will recognize that the actual durometer of the elastomer selected is a design choice dependent on the application the apparatus 500 is intended for. In other words, the more rigid the elastomer between the flexible layers, the more resistive the apparatus 500 will be to deflection.

Figure 6A:
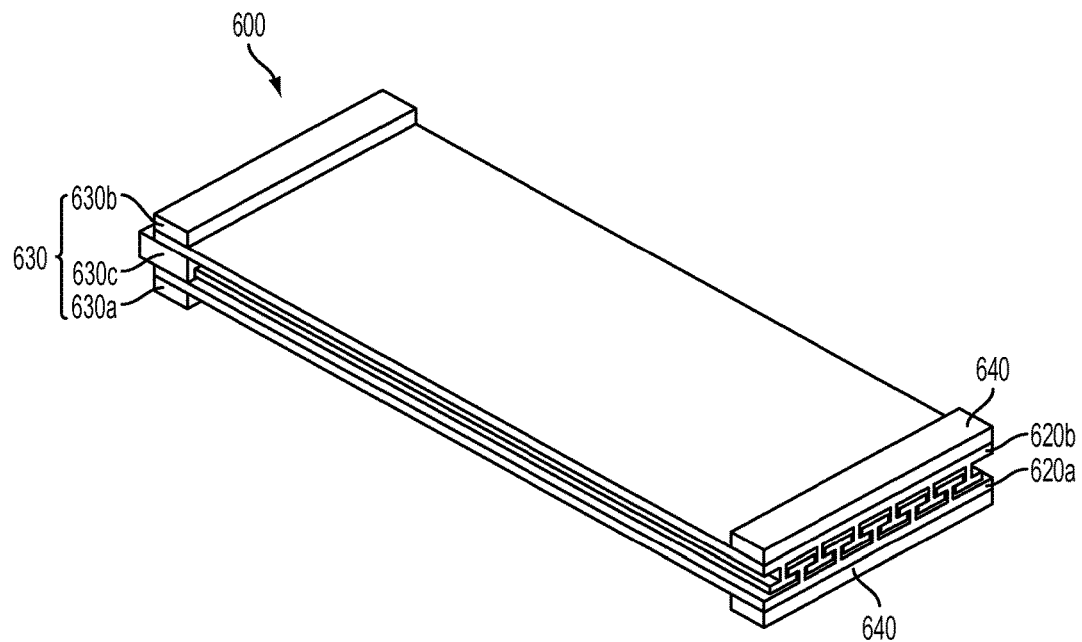
FIG. 6A is a parallel perspective illustration of an embodiment of an adjustable support structure in a relaxed position with a pair of substantially parallel layers coupled longitudinally interlocking T-shaped rails.
Figure 6B:
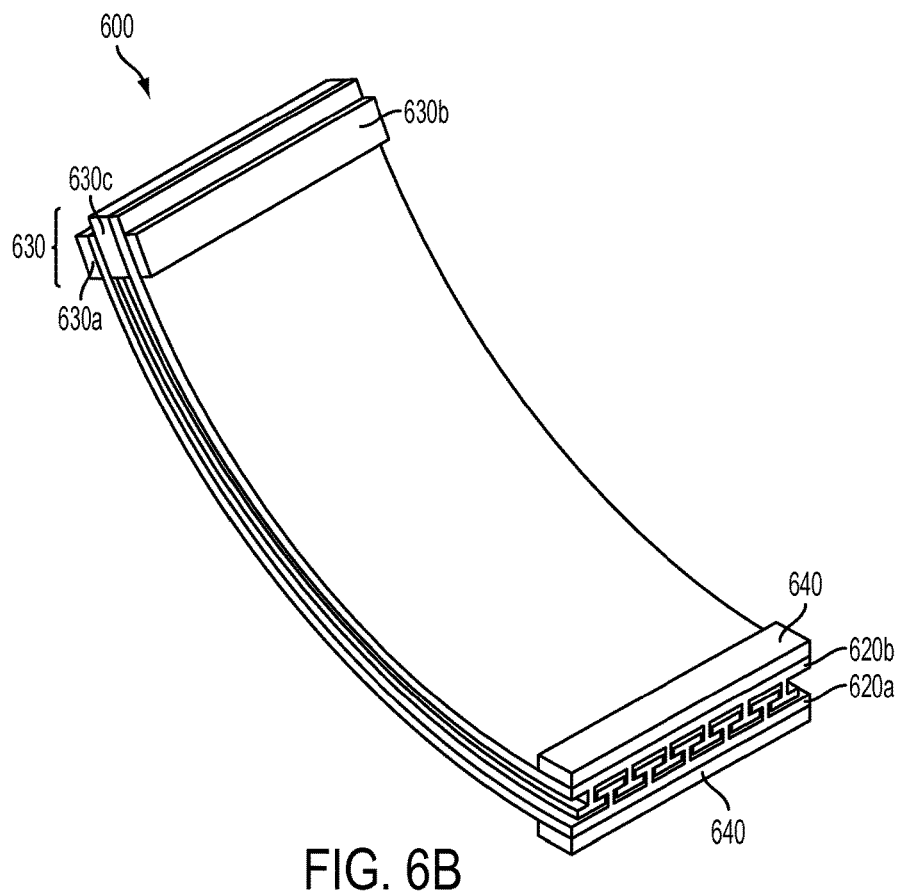
FIG. 6B is a parallel perspective illustration of the embodiment of FIG. 6A in a flexed position.
Figure 6C:
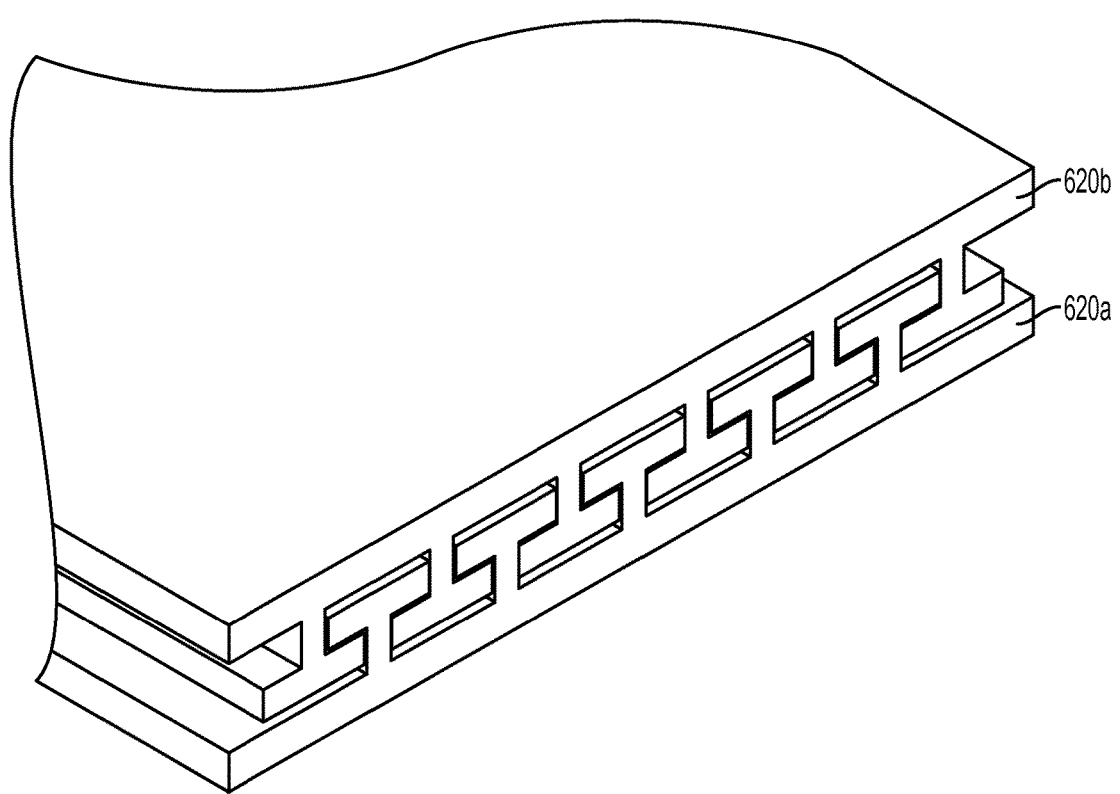
FIG. 6C is a detail view of the longitudinally interlocking T-shaped rails.
Figure 7A:
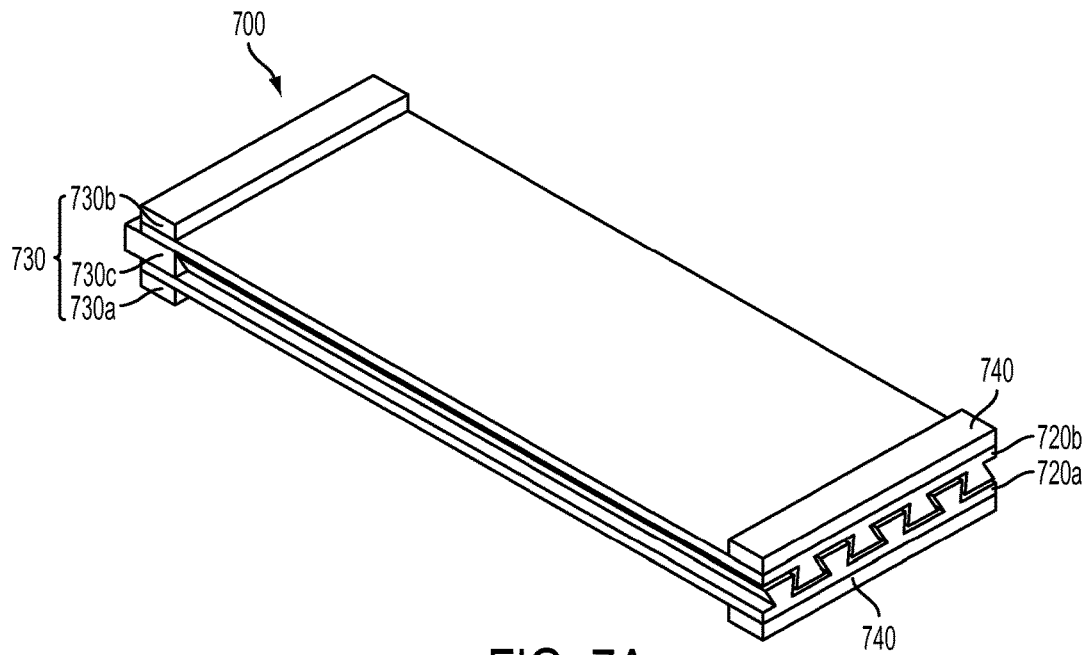
FIG. 7A is a parallel perspective illustration of an embodiment of an adjustable support structure in a relaxed position with a pair of substantially parallel layers coupled longitudinally interlocking trapezoid-shaped rails.
Figure 7B:
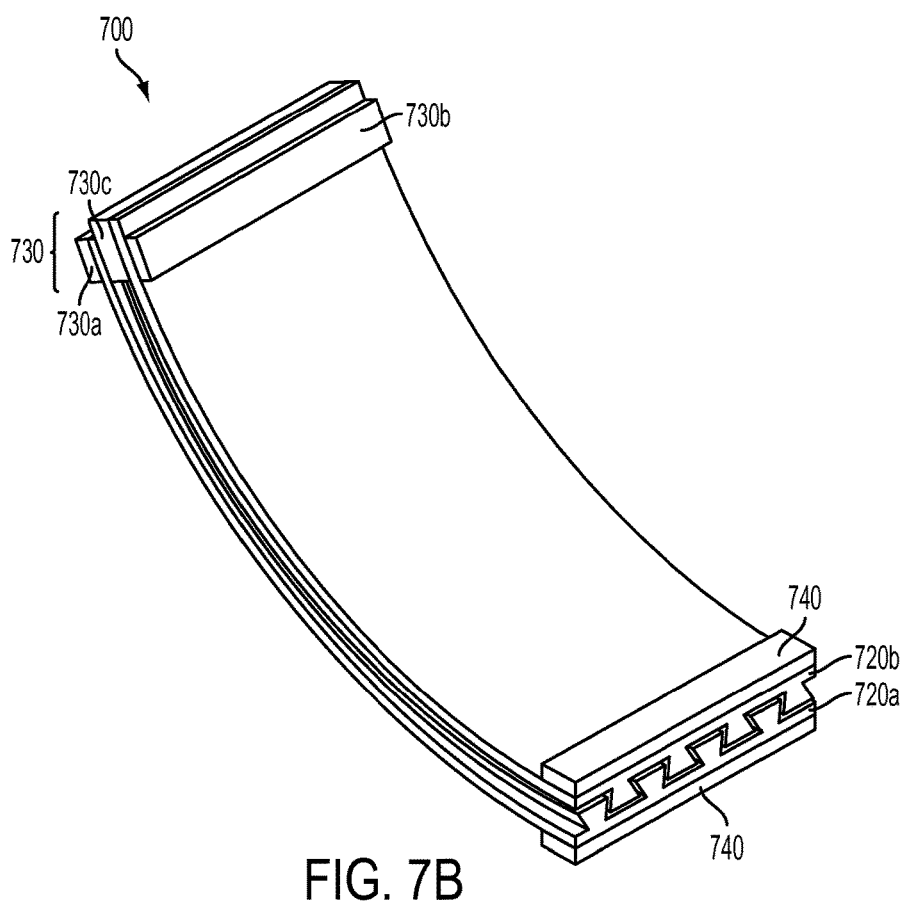
FIG. 7B is a parallel perspective illustration of the embodiment of FIG. 7A in a flexed position.
Figure 7C:
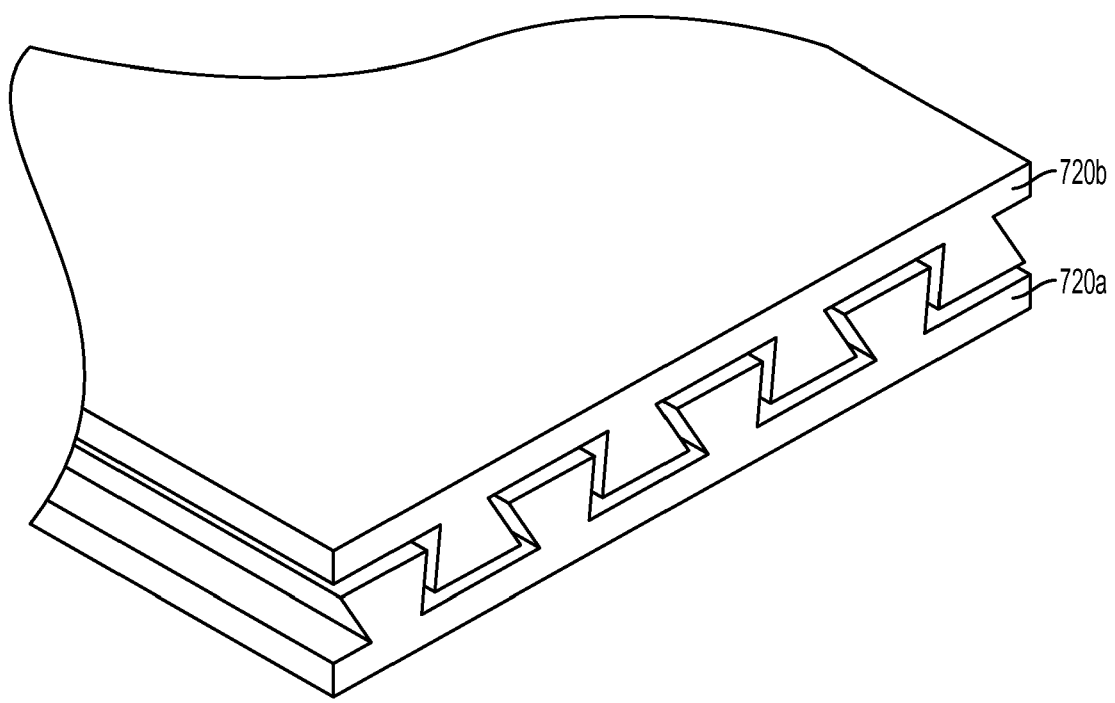
FIG. 7C is a detail view of the longitudinally interlocking trapezoid-shaped rails.

In a further embodiment, the flexible coupling between the layers may be provided by a series of longitudinally interlocking rails. FIGS. 6A-6C demonstrate such an embodiment. In the illustrated embodiment, upper layer 620b and lower layer 620a are each coupled to a plurality of substantially parallel rails whose cross sectional geometry interlocks with the layer opposite in such a way that the upper and lower layer retain substantial parallelism when deflected. In this embodiment, the interlocking cross sectional geometry is T-shaped, but one of skill in the art can appreciate that arbitrary interlocking geometries may provide the same result (see, e.g. FIGS. 7A-7C).

Figure 8A:
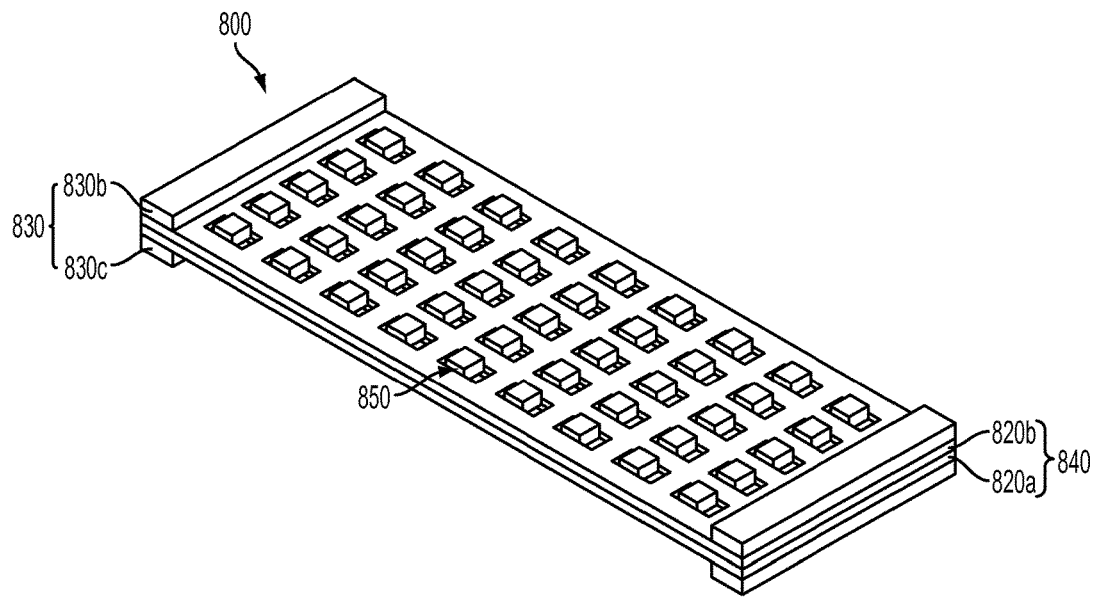
FIG. 8A is a parallel perspective illustration of an embodiment of an adjustable support structure in a relaxed position with a pair of substantially parallel layers coupled with paired and opposite punched and bent tabs.
Figure 8B:
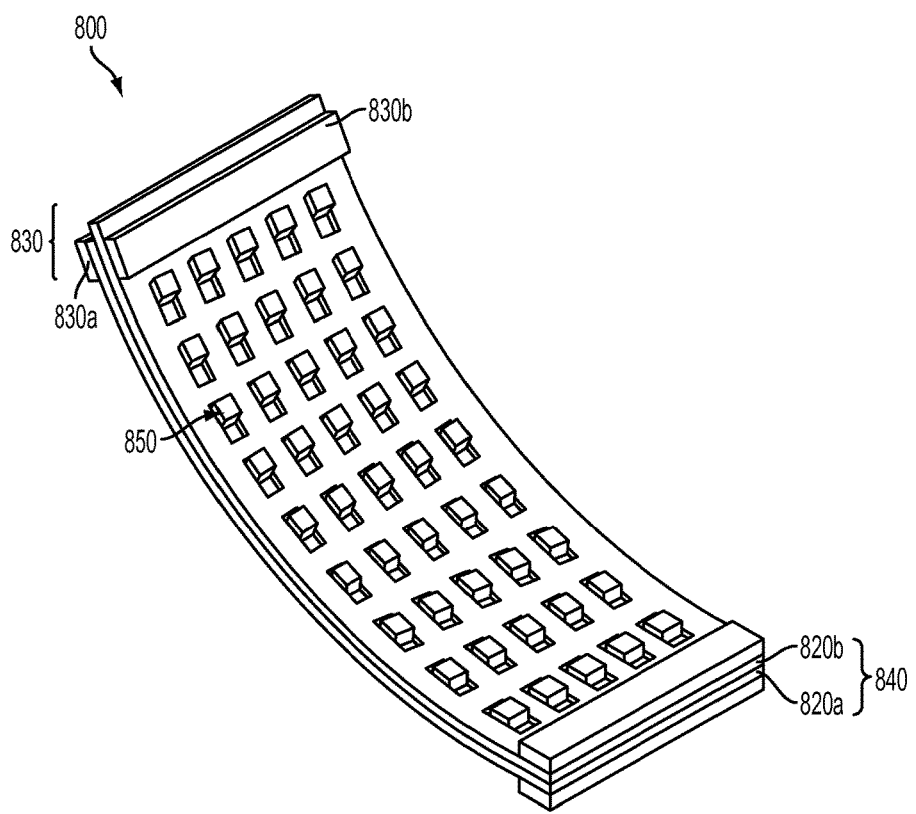
FIG. 8B is a parallel perspective illustration of the embodiment of FIG. 8A in a flexed position.
Figure 8C:
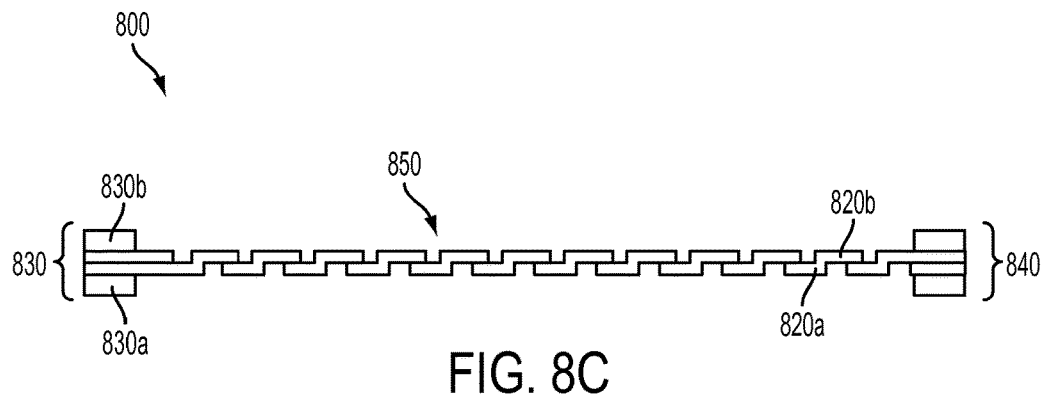
FIG. 8C is a longitudinal cross section counterpart to FIG. 8A showing the paired and opposite punched and bent tabs.
Figure 8D:
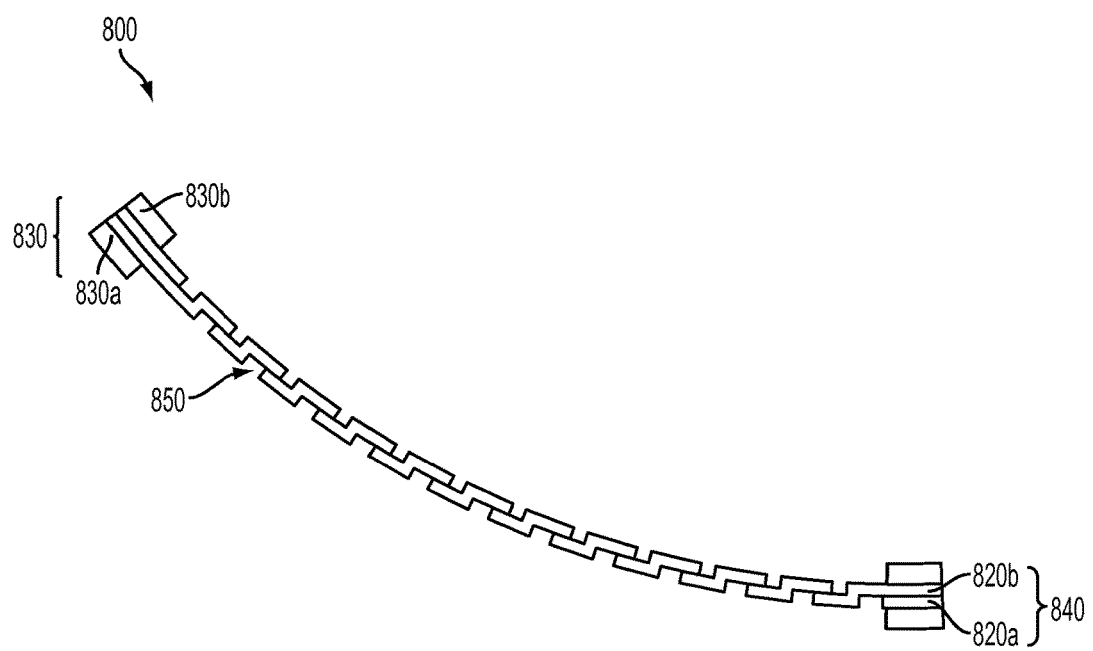
FIG. 8D is a longitudinal cross section counterpart to FIG. 8B showing the paired and opposite punched and bent tabs.
Figure 9A:
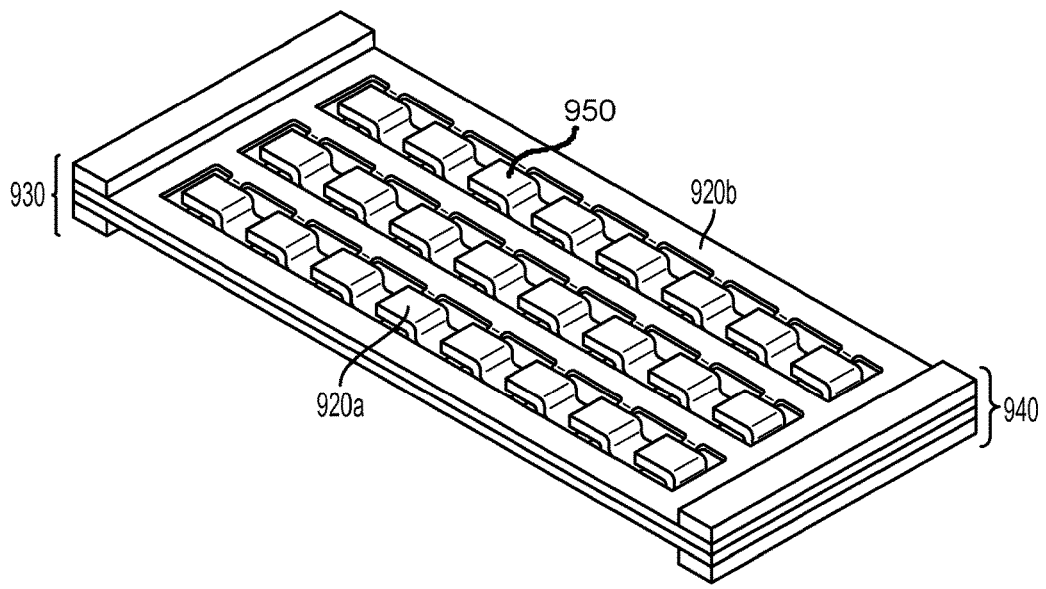
FIG. 9A is a parallel perspective illustration of an embodiment of an adjustable support structure in a relaxed position with a pair of substantially parallel layers coupled with complementary interlocking geometries, one layer providing tabs sliding into the second layer providing openings.
Figure 9B:
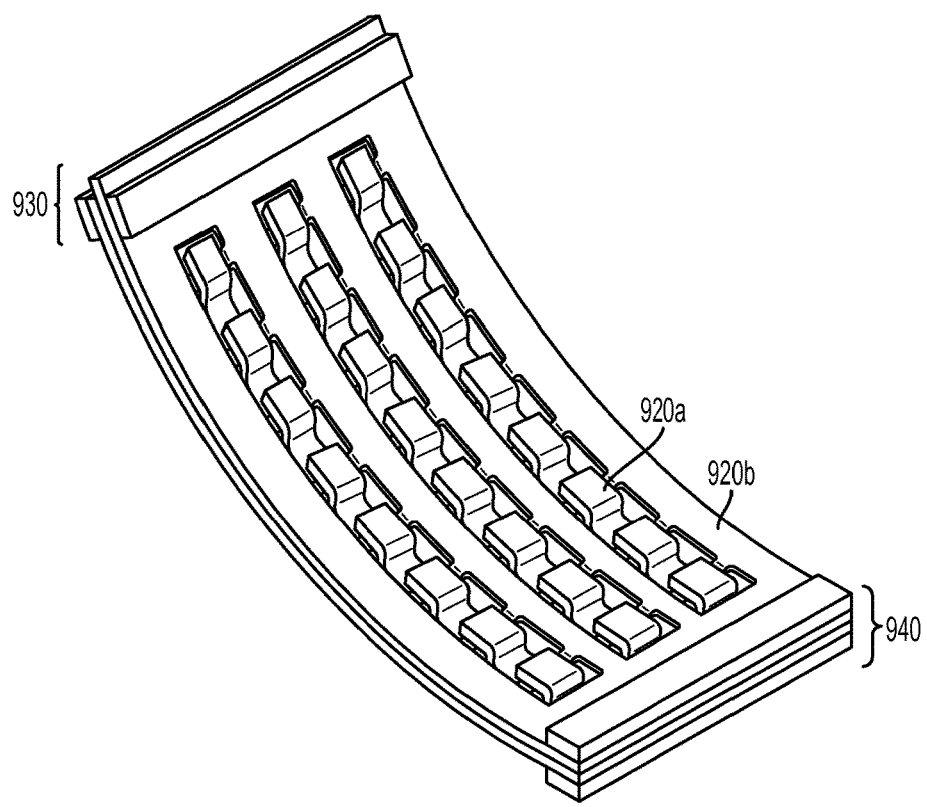
FIG. 9B is a parallel perspective illustration of the embodiment of FIG. 9A in a flexed position.
Figure 9C:
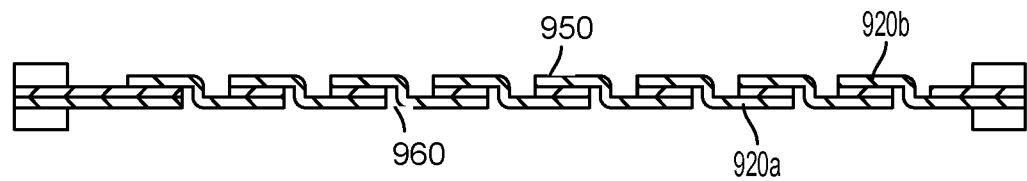
FIG. 9C is a longitudinal cross section counterpart to FIG. 9A showing the complementary interlocking geometries.
Figure 9D:
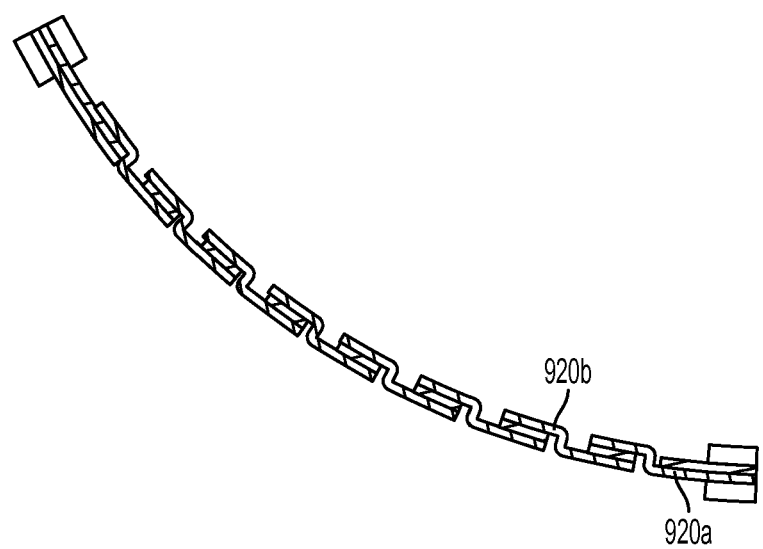
FIG. 9D is a longitudinal cross section counterpart to FIG. 9B showing the complementary interlocking geometries.
Figure 10A:
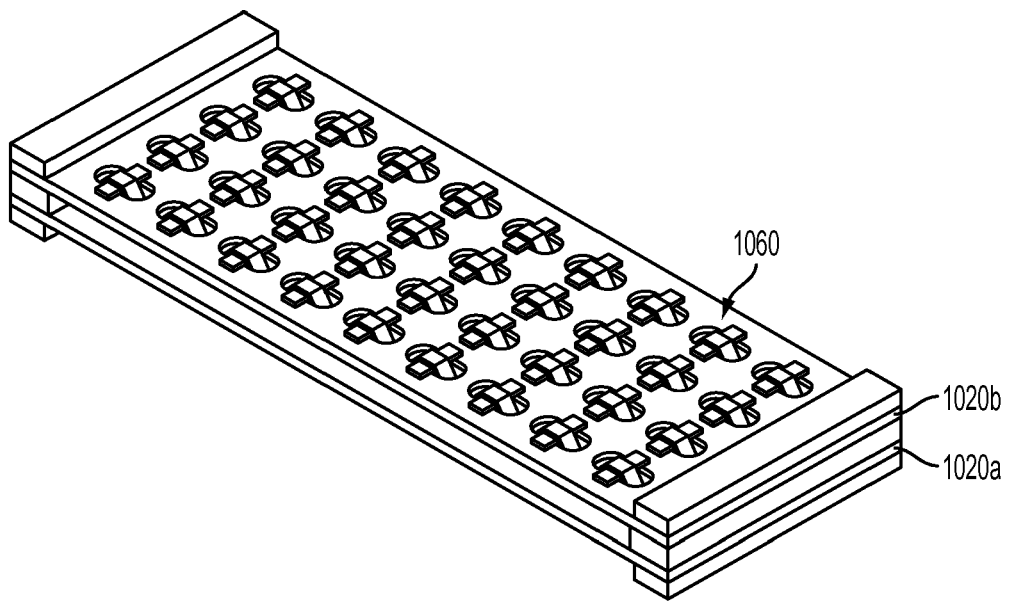
FIG. 10A is a parallel perspective illustration of an embodiment of an adjustable support structure in a relaxed position with a pair of substantially parallel layers coupled by one layer providing an oblong aperture through which a punched geometry of the second layer may be inserted through and secured with a locking pin.
Figure 10B:
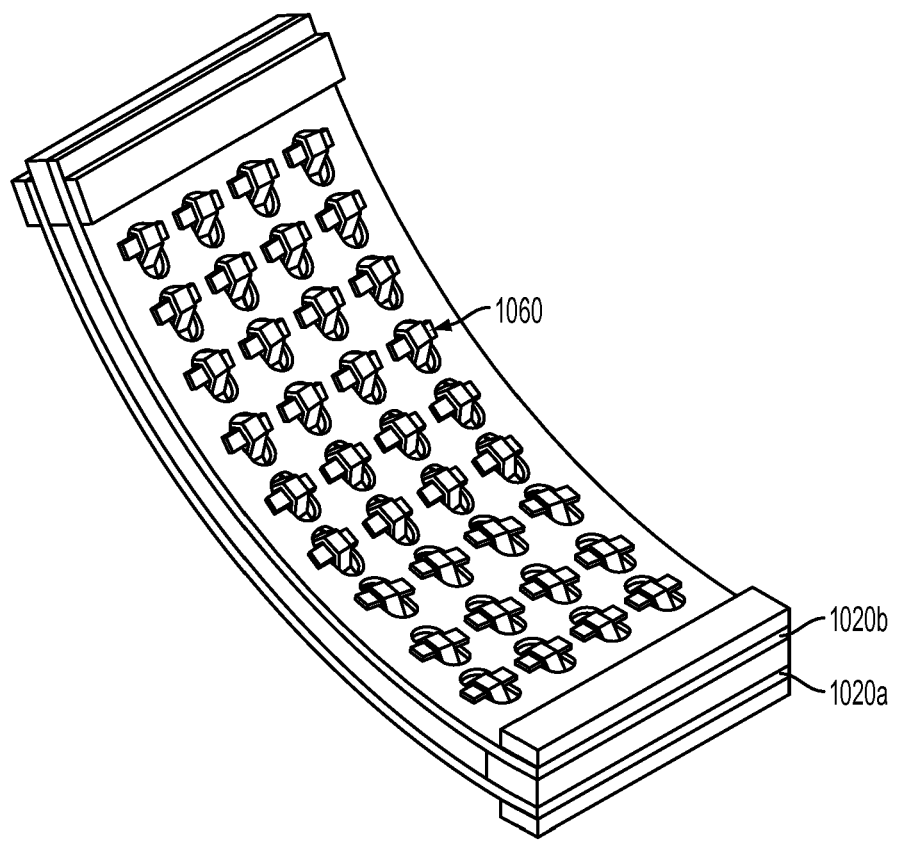
FIG. 10B is a parallel perspective illustration of the embodiment of FIG. 10A in a flexed position.
Figure 10C:
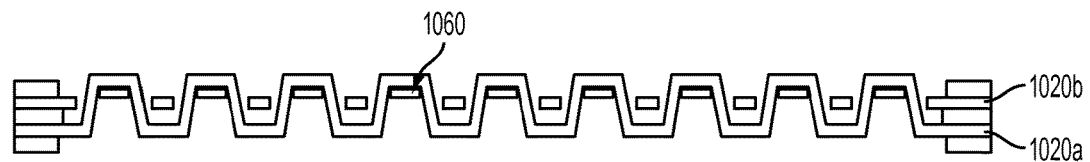
FIG. 10C is a longitudinal cross section counterpart to FIG. 10A.
Figure 10D:
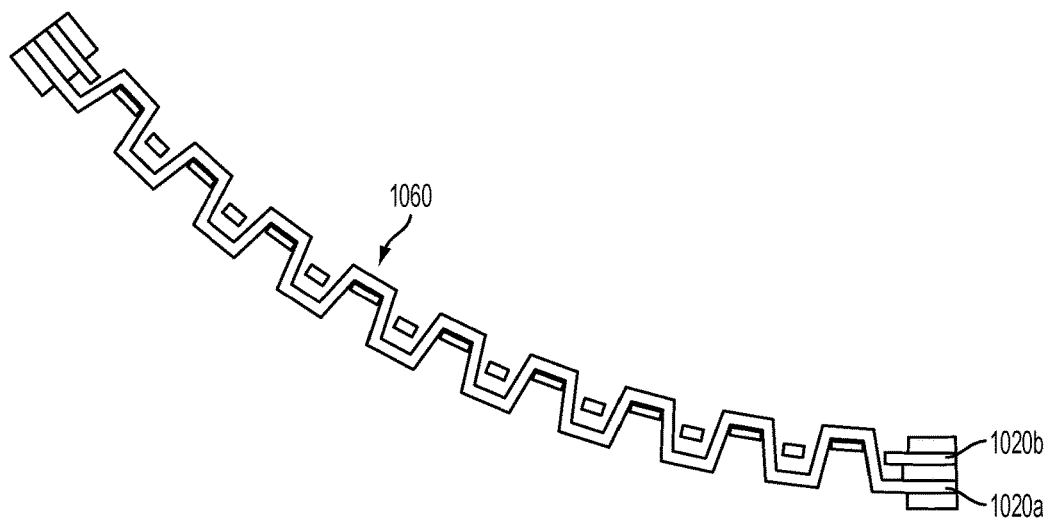
FIG. 10D is a longitudinal cross section counterpart to FIG. 10B.
Figure 11A:
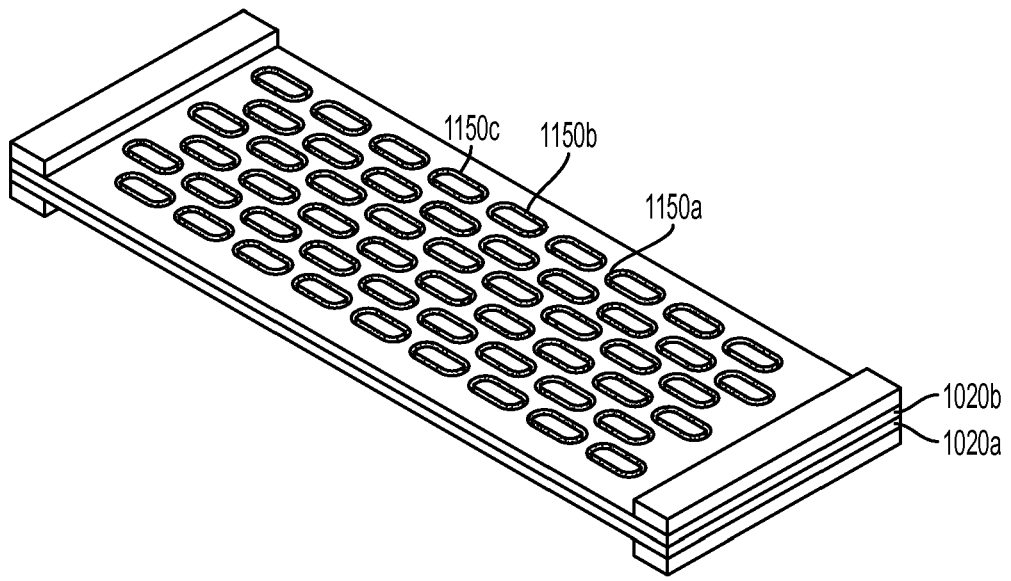
FIG. 11A is a parallel perspective illustration of an embodiment of an adjustable support structure in a relaxed position with a pair of substantially parallel layers where the upper layer has a plurality of oblong openings and the bottom layer is formed with oblong inserts that fit within the openings, the remaining volume is filled with a low durometer elastomer.
Figure 11B:
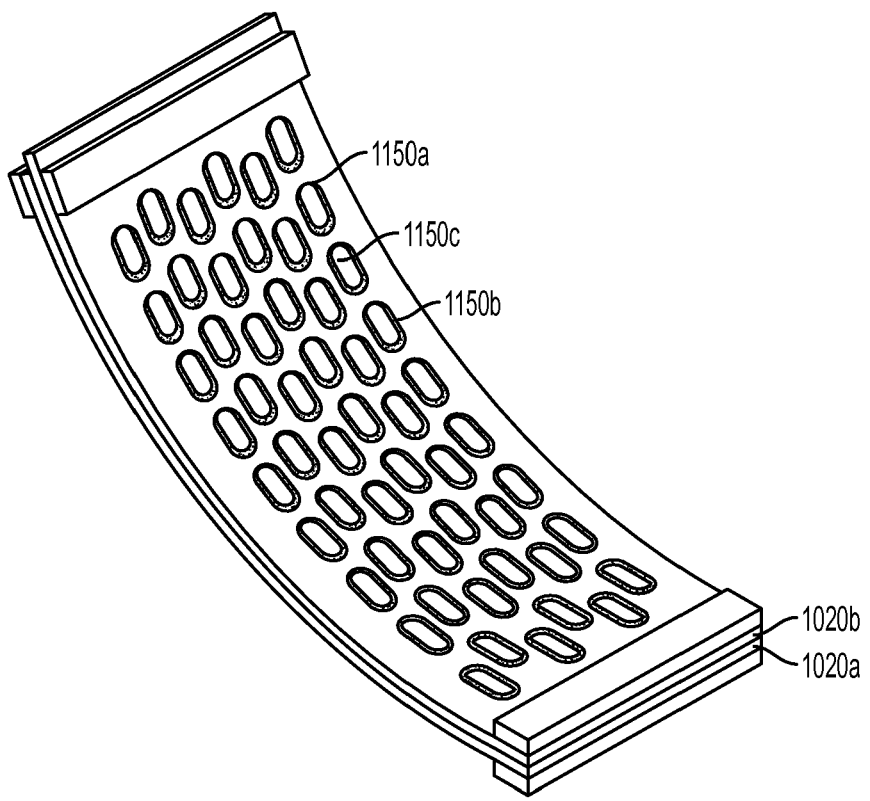
FIG. 11B is a parallel perspective illustration of the embodiment of FIG. 11A in a flexed position.
Figure 11C:
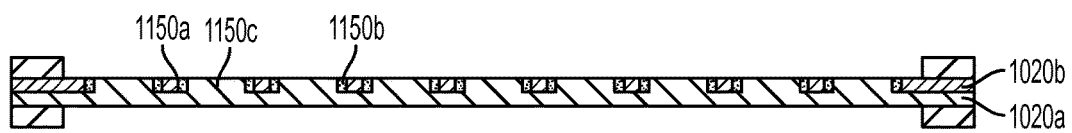
FIG. 11C is a longitudinal cross section counterpart to FIG. 11A.
Figure 11D:
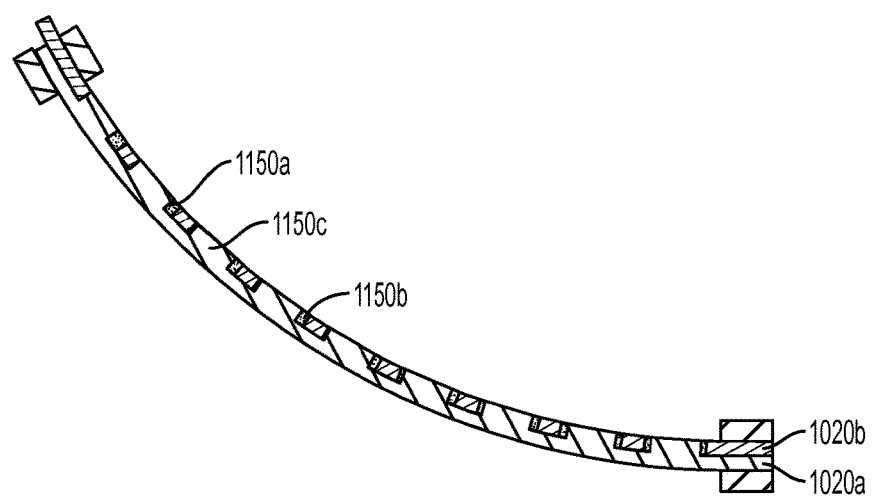
FIG. 11D is a longitudinal cross section counterpart to FIG. 11B.

In a further embodiment, the flexible coupling between the layers may be provided by a series of punched and bent tabs that interlock between the upper and lower layer. FIGS. 8A-8D demonstrate such an embodiment. Upper and lower layers (820b and 820a respectively) may be manufactured with a plurality of tabs. These tabs 850 may be bent so as shown in FIG. 8C such that the bent tabs of the upper layer insert below the bent tab if the lower layer. In this way, the tabs may couple the upper layer to the lower layer such that when the apparatus 800 is deflected, the upper layer and the lower layer remain substantially parallel. One having read this disclosure will appreciate that the tab may be of arbitrary geometry so long as it interlocks with another tab on an opposing layer.

In a further embodiment, the flexible coupling between the layers may be provided by a series of punched and bent tabs in a first layer that interlock with apertures punched into a second layer. FIGS. 9A-9D demonstrate such an embodiment, showing tabs 950 inserted into aperture 960. In this way, the tab and aperture provide a coupling between the upper layer 920a and lower layer 920b such that when the apparatus 900 deflects, the upper layer and lower layer remain substantially parallel. A similar embodiment is shown in FIGS. 10A-10D where the punched tab may be secured with pinned insert 1060.

In a further embodiment, the flexible coupling between the layers may be provided with a plurality of oblong apertures in a first layer that receive oblong inserts of a smaller length are structurally coupled to a second layer. The remaining volume between the insert and the sidewall of the aperture may be filled with a low durometer elastomer. This embodiment is illustrated in FIGS. 11A-11D. In this disclosed embodiment, the coupling comprises three distinct parts—an aperture 1150*a*, an elastomer 1150*b*, and an insert 1150*c*. Because the insert 1150*c* has a smaller length than the aperture 1150*a*, it is permitted to freely slide longitudinally until it contacts a sidewall of the aperture 1150*a*. When the elastomer 1150*b* is injected, however, the amount that the insert can slide is constrained. Further, the elastomer bonds the insert to the sidewall of the aperture such that the two layers are difficult to separate. In this way the upper layer and lower layer will maintain substantial parallelism during deflection of the apparatus. One having read this disclosure will appreciate that the distribution of the aperture-insert pairs is arbitrary and that a single layer may have both apertures and inserts so long as those apertures and inserts pair with inserts and apertures of the opposing layer. In a further embodiment, a single layer may have only apertures, and the opposing layer may have only inserts.

Figure 12A:
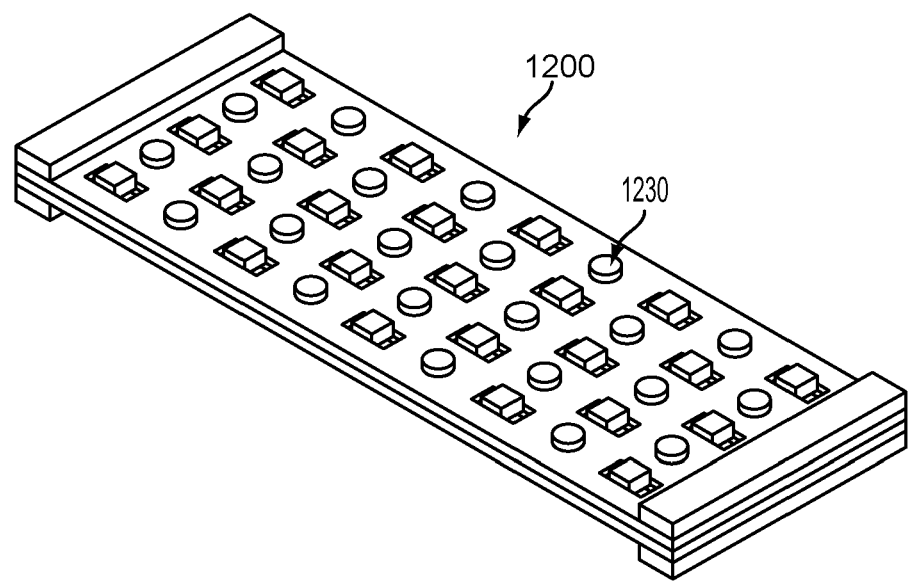
FIG. 12A is an overhead view of an embodiment similar to FIGS. 8A-8D with the addition of distributed braking rivets.
Figure 12B:
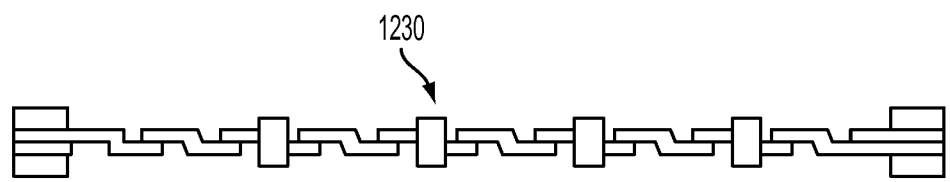
FIG. 12B is a longitudinal cross section of the embodiment shown in FIG. 12A.
Figure 12C:
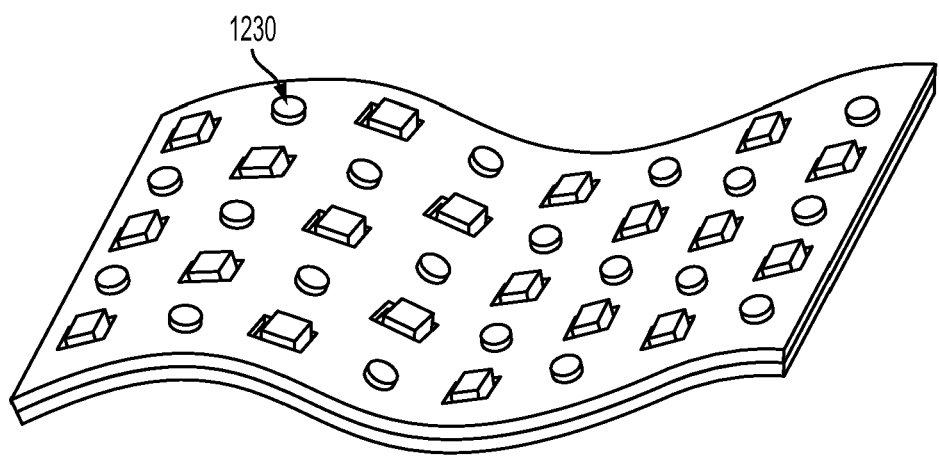
FIG. 12C is a parallel perspective illustration of the embodiment shown in FIGS. 12A-12B demonstrating the ability to maintain the position of multiple curves.
Figure 13A:
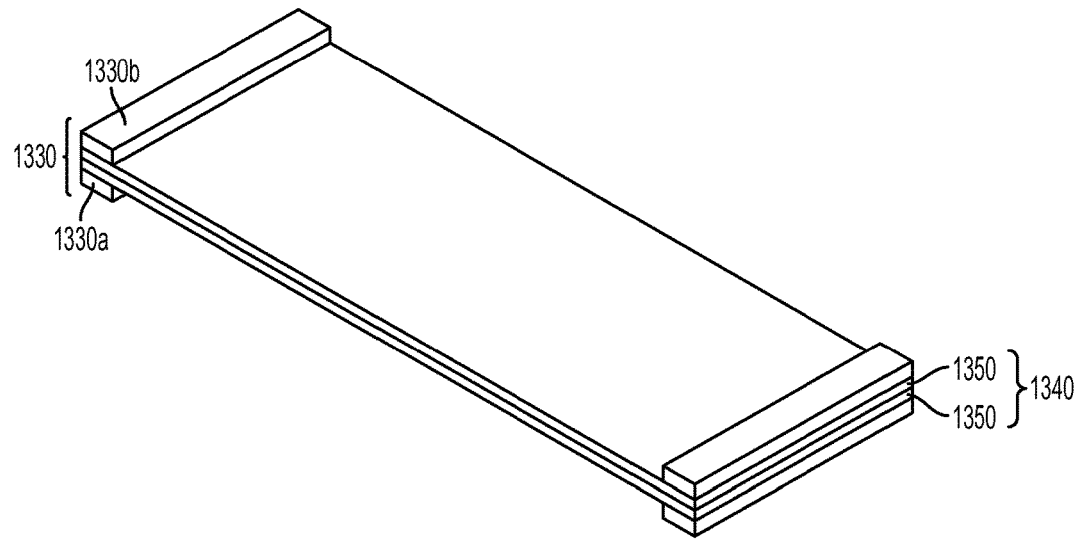
FIG. 13A is a parallel perspective illustration of an embodiment of an adjustable support structure in a relaxed position with a pair of substantially parallel magnetically attracted layers.
Figure 13B:
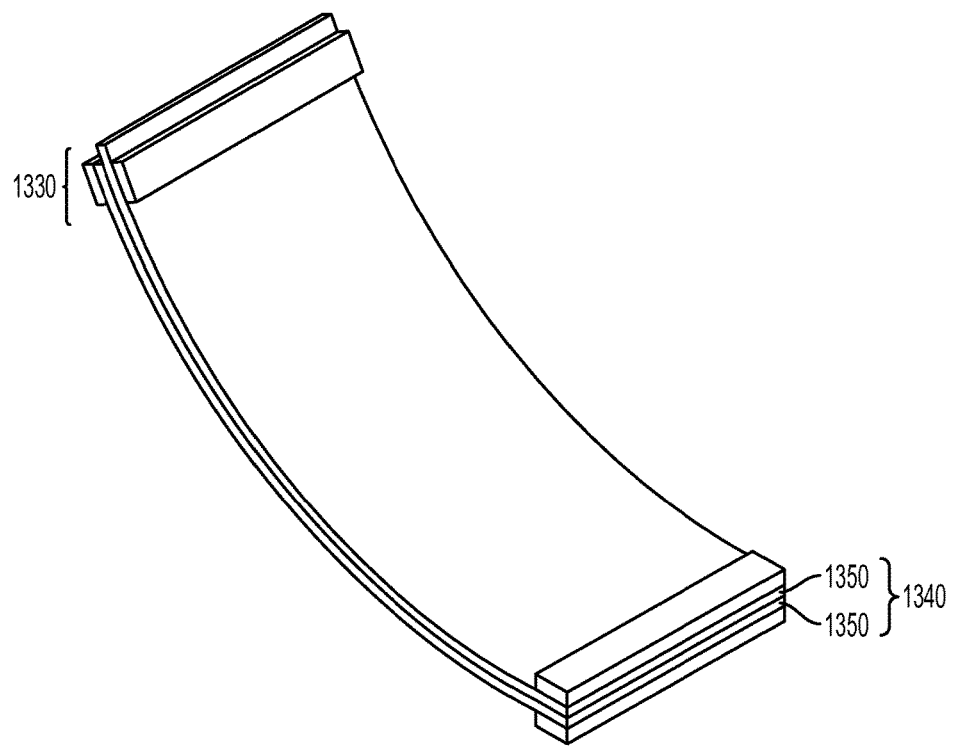
FIG. 13B is a parallel perspective illustration of the embodiment of FIG. 13A in a flexed position.

In another embodiment, the apparatus may employ distributed friction braking. In embodiments previously disclosed, the displacement brake has been located only at the edge of coupled layers. In these and other embodiments, the location of the friction that provides the force of friction may be distributed throughout the structure. An exemplary embodiment illustrating distributed braking is shown in FIGS. 12A-12C. As shown throughout the structure 1200 are distributed small displacement brakes 1230 that each contain at upper friction pad, lower friction pad, and interior friction pad. The coupling of the embodiment of apparatus 1200 is similar to the tab apparatus shown in FIGS. 8A-8D. One having read this disclosure will appreciate that by distributing the displacement brakes, the force of friction required by each brake is reduced. Further, the distribution of displacement brakes allows for more intricate shapes to be produced and held, as shown in FIG. 12C.

In a further embodiment, the coupling between layers may be provided by magnetic attraction 1350 between the layers. Such an embodiment is illustrated in FIGS. 13A-13D.

Figure 14A:
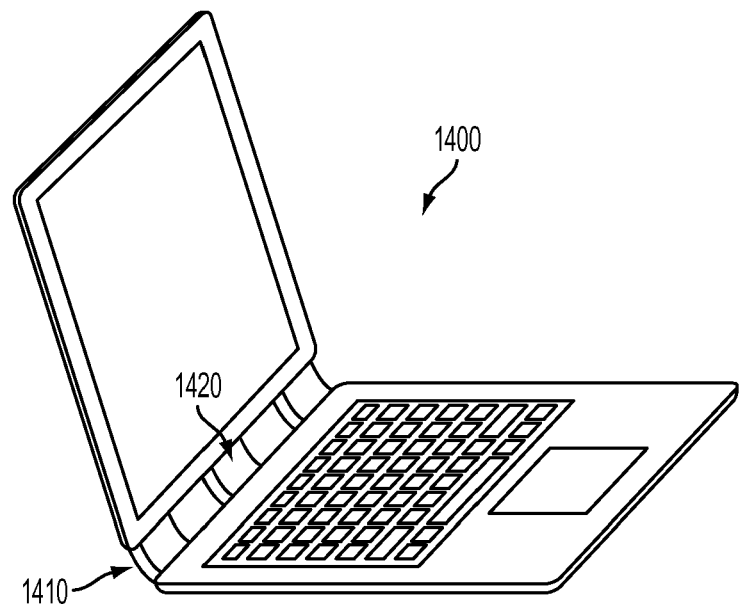
FIG. 14A illustrates a parallel perspective view of a potential embodiment where the adjustable support structure provides support to the monitor portion of a portable computer.
Figure 14B:
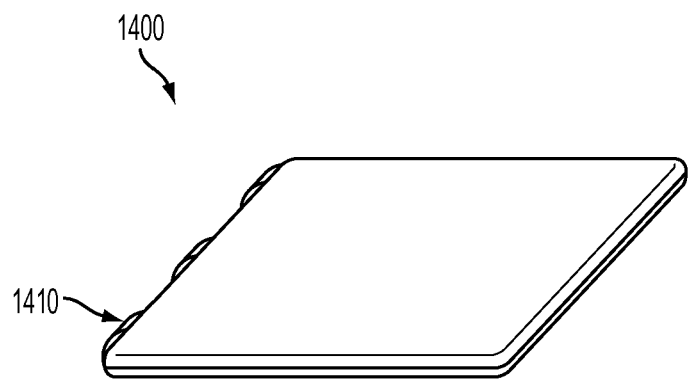
FIG. 14B illustrates a parallel perspective view of the embodiment of FIG. 14A, showing the lid of the portable computer closed.

The adjustable support structure as disclosed may be used in certain embodiments to support the screen of portable laptop computer. FIG. 14A shows an embodiment where three independent support structures 1410, 1420 are used to support the load of an open laptop screen. FIG. 14B shows the embodiment of the laptop computer in closed position. In certain embodiments such as that shown in FIG. 14A, necessary wiring or electrical cabling required for the operation of the laptop screen may be fed through the interior of one or all of the separate support structures.

Figure 15A:
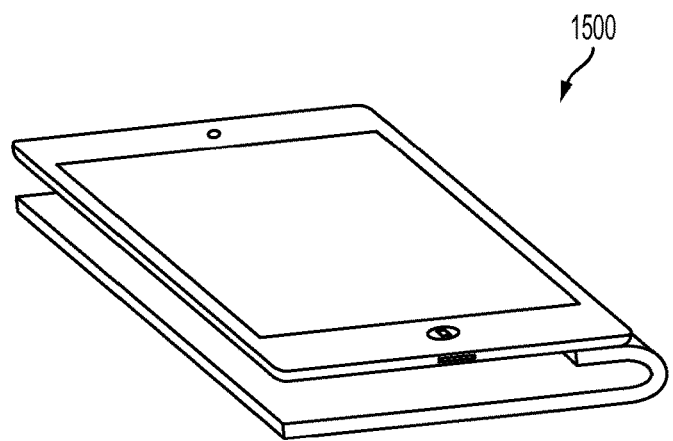
FIG. 15A illustrates a parallel perspective view of a potential embodiment where the adjustable support structure functions as a cover and a stand for a portable tablet computer.
Figure 15B:
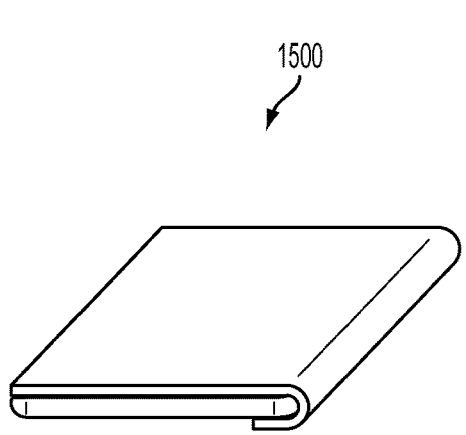
FIG. 15B illustrates a parallel perspective view of the embodiment of FIG. 15A, showing the adjustable support cover in a closed position.
Figure 15C:
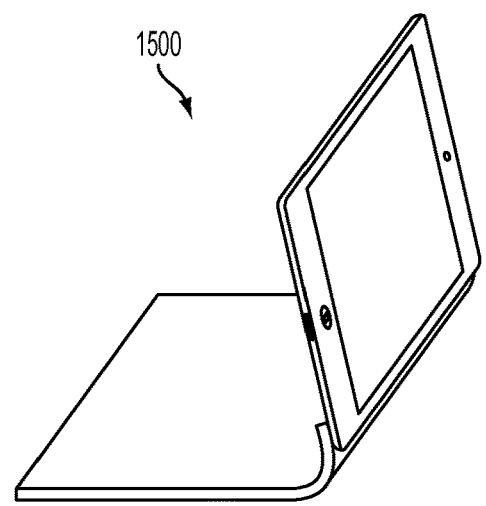
FIG. 15C illustrates a parallel perspective view of the embodiment of FIG. 15A-15B, showing the adjustable support cover in a wrapped position.

The adjustable support structure as disclosed may be used in certain embodiment as a cover and stand of a portable tablet computer. FIG. 15A shows an embodiment where the support structure 1500 is used to support a portable tablet computer in a first position. FIG. 15B shows the embodiment shown in FIG. 15A where the structure 1500 has been deformed to cover the screen of the shown portable tablet computer. A third position, of the adjustable support structure is shown in FIG. 15C, where the structure 1500 is bent in such a way as to support the tablet in an upright position.

Figure 16A:
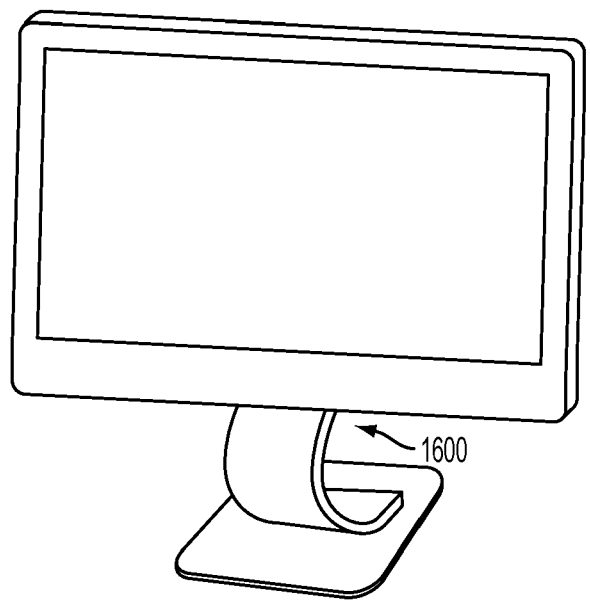
FIG. 16A illustrates a parallel perspective view of an adjustable support structure embodiment used in a desktop computing system.
Figure 16B:
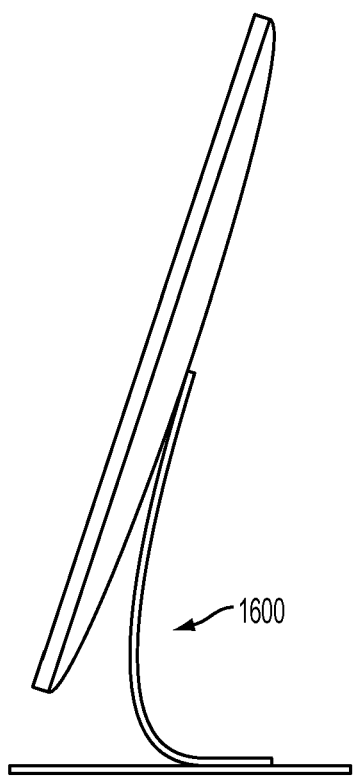
FIG. 16B illustrates a cross section view counterpart to FIG. 16A.

The adjustable support structure as disclosed may be used in certain embodiments to support the screen of desktop computer. FIG. 16A shows an embodiment where a support structure 1600 is used to support the load of an open desktop screen. FIG. 16B shows a cross section of the embodiment of the desktop computer. In certain embodiments such as that shown in FIG. 16A, necessary wiring or electrical cabling required for the operation of the desktop screen may be fed through the interior of the support structure.

Figure 17A:
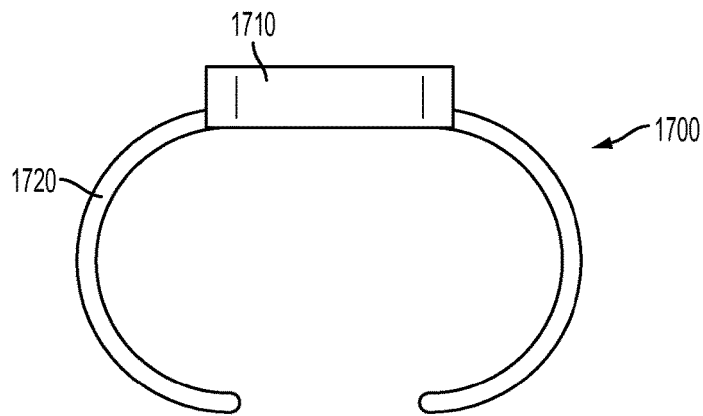
FIG. 17A illustrates a cross sectional view of a potential embodiment where the adjustable support structure comprises the band of a wearable electronic device.
Figure 17B:
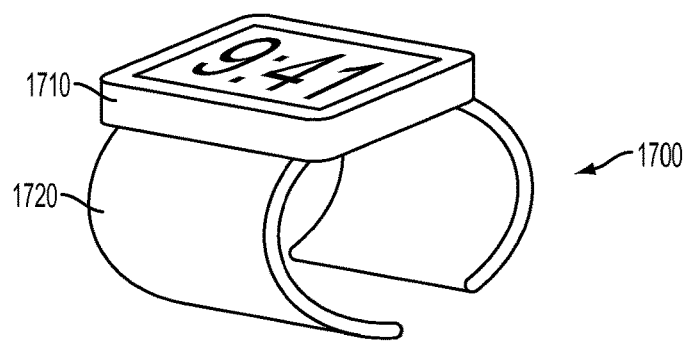
FIG. 17B illustrates a parallel perspective view counterpart to FIG. 17A.
Figure 17C:
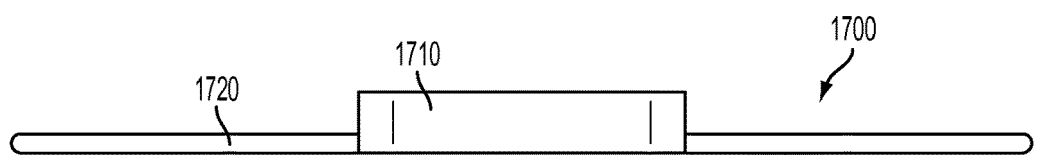
FIG. 17C illustrates a cross sectional view counterpart to FIG. 17A, wherein the support structure is fully extended.

The adjustable support structure as disclosed may be used in certain embodiments as a wearable structure supporting a portable electronic device, such as a watch. FIG. 17A-C illustrate different perspective angles of such an embodiment 1700.

Figure 18:
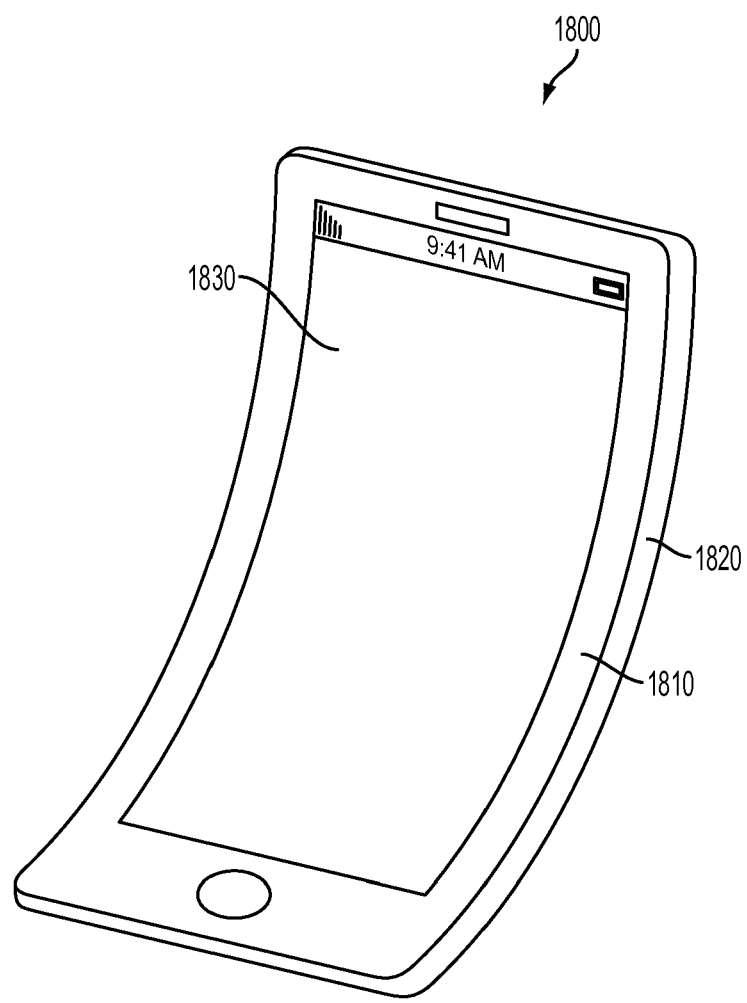
FIG. 18 illustrates a parallel perspective view of a potential embodiment where the adjustable support structure comprises the body of a bendable and portable electronic device, such as a cellular phone.

The adjustable support structure as disclosed may also be used in certain embodiments in the housing of portable electronic devices. FIG. 18 illustrates a parallel perspective view of a potential embodiment where the adjustable support structure comprises the body of a bendable and portable electronic device, such as a cellular phone.

Readers of this disclosure will understand that the two layers illustrated throughout each disclosed and illustrated embodiment are only exemplary, and that any number of layers may be used. Similarly, the various types of couplings disclosed herein are not intended to be limiting or otherwise exhaustive; there may be many more materials, configurations, and dimensions of couplings within the scope of this disclosure. For instance, in certain embodiments multiple types of couplings may be used between the same layers of materials.

Readers of this disclosure will also understand that the amount of compressive friction applied by the displacement brake may be either static or dynamic, automatic or manual. For instance, in certain embodiments, the amount of compression provided by the displacement brake may be fixed in a manufacturing process of the structure. In other embodiments, the displacement brake may include a screw as the coupling between friction pads. Tightening of the screw causes the compressive friction to increase, loosening of the screw causes the compressive friction to decrease. In this way, the amount of support that the structure provides may be adjusted manually. In still further embodiments, the compressive friction provided by the displacement brake may be applied through magnetic attraction between the friction pads. Introducing an electromagnet to this embodiment would permit electrically-adjustable compressive friction. A reader of this disclosure may understand that this listing of potential displacement brake embodiments is not meant to be limiting or exhaustive.

What is claimed is:

1. An electronic device comprising:
    a first portion having a display;
    a second portion; and
    a hinge coupled to the first portion and the second portion, wherein the hinge bends about a bend axis and wherein the hinge has adjustable structures comprising:
        first and second flexible layers having respective first and second lengths, wherein the first and second flexible layers slide relative to each other as the hinge is bent about the bend axis and interact to maintain the hinge at a bend angle about the bend axis, and wherein the first and second flexible layers are separated from each other by a fixed distance across the first and second lengths.

2. The electronic device defined in claim 1 wherein the second portion comprises a keyboard.

3. The electronic device defined in claim 1 wherein the adjustable structures further comprise a spacer interposed between the first and second flexible layers that maintains the fixed distance between the first and second flexible layers across an entirety of the first and second lengths as the hinge is bent.

4. The electronic device defined in claim 1 wherein the first and second flexible layers have first and second opposing ends, wherein the first and second flexible layers slide relative to each other at the first end, and wherein the first and second flexible layers are fixed at the second end.

5. An electronic device comprising:
a first housing portion having a display;
a second housing portion; and
a hinge coupled to the first housing portion and the second housing portion, wherein the hinge has adjustable structures comprising:
first and second flexible layers that slide relative to each other, allowing the hinge to bend about a bend axis;
a spacer interposed between the first and second flexible layers; and
a plurality of compression structures coupled to the first and second flexible layers that compress the first and second flexible layers to maintain the bend after the hinge is bent, wherein the plurality of compression structures includes first and second friction pads and wherein the first and second flexible layers are interposed between the first and second friction pads.

6. The electronic device defined in claim 5 further comprising a keyboard mounted in the second housing portion.

7. The electronic device defined in claim 6 wherein the first and second flexible layers have first and second opposing ends, wherein the first and second flexible layers slide relative to each other at the first end, and wherein the first and second flexible layers are fixed at the second end.

8. An electronic device comprising:
a first housing portion having a display;
a second housing portion having a keyboard; and
a hinge coupled between the first housing portion and the second housing portion, wherein the hinge has adjustable structures comprising:
first and second flexible layers that slide relative to each other, allowing the hinge to bend about a hinge axis, wherein the first and second flexible layers comprise an array of openings;
coupling structures that pass through the openings and bias the first and second flexible layers towards each other; and
compression structures coupled to the first and second flexible layers that compress the first and second flexible layers to maintain the bend after the hinge is bent.

9. The electronic device defined in claim 8 wherein the first and second flexible layers have first and second opposing ends, wherein the first and second flexible layers slide relative to each other at the first end, and wherein the first and second flexible layers are fixed at the second end.

10. The electronic device defined in claim 8 wherein the coupling structures are rivets.

11. The electronic device defined in claim 10 wherein the array of openings comprises an array of oblong openings and wherein the rivets pass through the oblong openings.

12. The electronic device defined in claim 11 wherein the compression structures comprise friction pads.

13. The electronic device defined in claim 12 wherein the adjustable structures further comprise a spacer interposed between the first and second flexible layers.

14. The electronic device defined in claim 8 wherein the array of openings comprises an array of oblong openings.

15. The electronic device defined in claim 8 wherein the coupling structures are bands.

16. The electronic device defined in claim 15 wherein the array of openings comprises an array of oblong openings and wherein the bands pass through the oblong openings.

17. The electronic device defined in claim 16 wherein the compression structures comprise friction pads.

18. The electronic device defined in claim 8 wherein the compression structures comprise friction pads.

19. The electronic device defined in claim 18 wherein the adjustable structures further comprise a spacer interposed between the first and second flexible layers.

20. The electronic device defined in claim 8 wherein the adjustable structures further comprise a spacer interposed between the first and second flexible layers.

* * * * *